(12) United States Patent
Yagi et al.

(10) Patent No.: US 9,097,831 B2
(45) Date of Patent: Aug. 4, 2015

(54) SURFACE LIGHT SOURCE DEVICE, LIGHT GUIDE ELEMENT USED FOR SURFACE LIGHT SOURCE DEVICE, AND METHOD FOR PRODUCING LIGHT GUIDE ELEMENT

(75) Inventors: Kenji Yagi, Yokohama (JP); Minoru Shimizu, Yokohama (JP); Yasuo Wakui, Yokohama (JP); Yoshiya Kurachi, Yokohama (JP); Masatoshi Toda, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 200 days.

(21) Appl. No.: 13/635,566

(22) PCT Filed: Mar. 15, 2011

(86) PCT No.: PCT/JP2011/056084
§ 371 (c)(1),
(2), (4) Date: Sep. 17, 2012

(87) PCT Pub. No.: WO2011/115124
PCT Pub. Date: Sep. 22, 2011

(65) Prior Publication Data
US 2013/0003412 A1    Jan. 3, 2013

(30) Foreign Application Priority Data
Mar. 17, 2010  (JP) ................. 2010-060932

(51) Int. Cl.
*F21V 7/04* (2006.01)
*F21V 8/00* (2006.01)
(52) U.S. Cl.
CPC ............ *G02B 6/0065* (2013.01); *G02B 6/0036* (2013.01)
(58) Field of Classification Search
CPC ...... G02B 6/0036; G02B 6/0065; F21V 8/00; B29C 35/08

USPC .................. 362/246, 617, 619, 623, 625, 629
See application file for complete search history.

(56) References Cited

U.S. PATENT DOCUMENTS

| | | | | |
|---|---|---|---|---|
| 5,269,977 A * | 12/1993 | Nakahashi et al. | ............. | 264/1.9 |
| 5,618,095 A * | 4/1997 | Kashima et al. | ............. | 362/625 |
| 2008/0013338 A1* | 1/2008 | Huang | ............. | 362/627 |
| 2008/0070998 A1 | 3/2008 | Takada et al. | | |
| 2008/0285307 A1 | 11/2008 | Aylward et al. | | |
| 2011/0167690 A1* | 7/2011 | Bjarnason et al. | ............. | 362/617 |

FOREIGN PATENT DOCUMENTS

| | | |
|---|---|---|
| JP | 7 204879 | 8/1995 |
| JP | 2006 155937 | 6/2006 |
| JP | 2007 87638 | 4/2007 |

(Continued)

OTHER PUBLICATIONS

International Search Report Issued Jun. 21, 2011 in PCT/JP11/056084 Filed Mar. 15, 2011.

*Primary Examiner* — Y M Lee
(74) *Attorney, Agent, or Firm* — Oblon, McClelland, Maier & Neustadt, L.L.P.

(57) ABSTRACT

Disclosed is a plate-like light guide element (24) provided with a light incident surface, a light exit surface (242), and an underside surface (243) disposed on the opposite side of the light exit surface (242). A foamed surface layer (244) is formed on at least a part of at least either the light exit surface (242) or the underside surface (243). The foamed surface layer (244) contains air bubbles and has a recessed sectional surface including the normal direction of the light exit surface (242) or the underside surface (243). The light guide element (24) is produced by performing infrared laser etching for at least a part of at least one of the main surfaces of a plate-like light guide element material composed of an acryl resin plate produced by a continuous plate production method, to form the foamed surface layer (244).

20 Claims, 11 Drawing Sheets

(56) References Cited

FOREIGN PATENT DOCUMENTS

| JP | 2007227050 A | * | 9/2007 |
| JP | 2009 43705 | | 2/2009 |
| JP | 2009 266830 | | 11/2009 |
| WO | 2005 073625 | | 8/2005 |

* cited by examiner

FIG.6
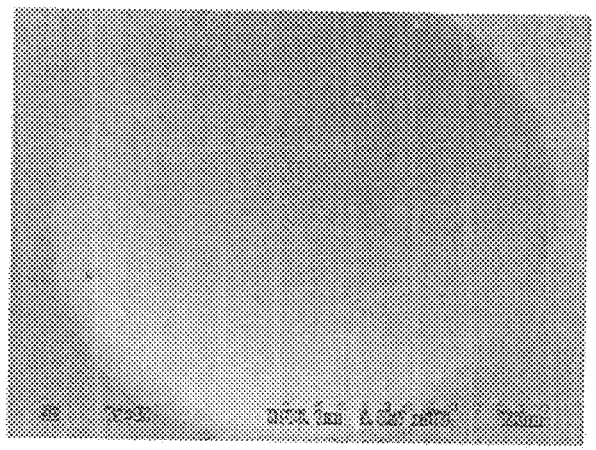
FIG.7
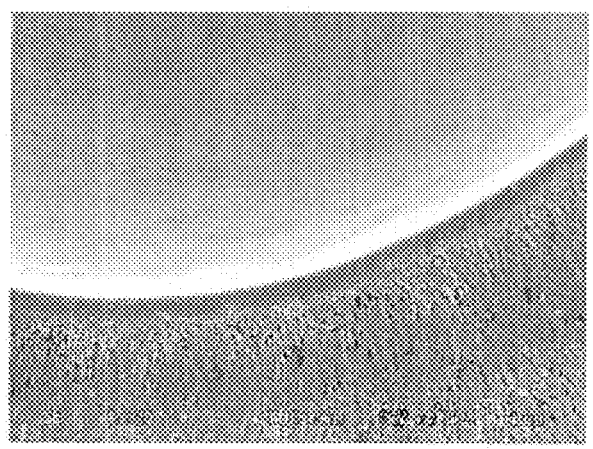
FIG.8
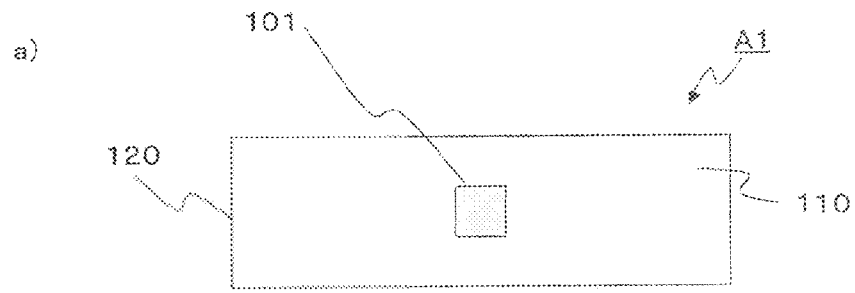
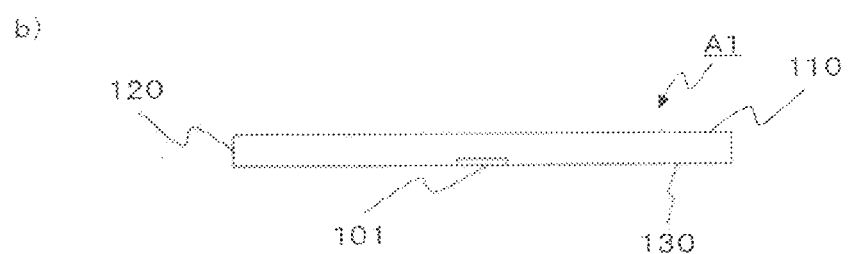

FIG.11
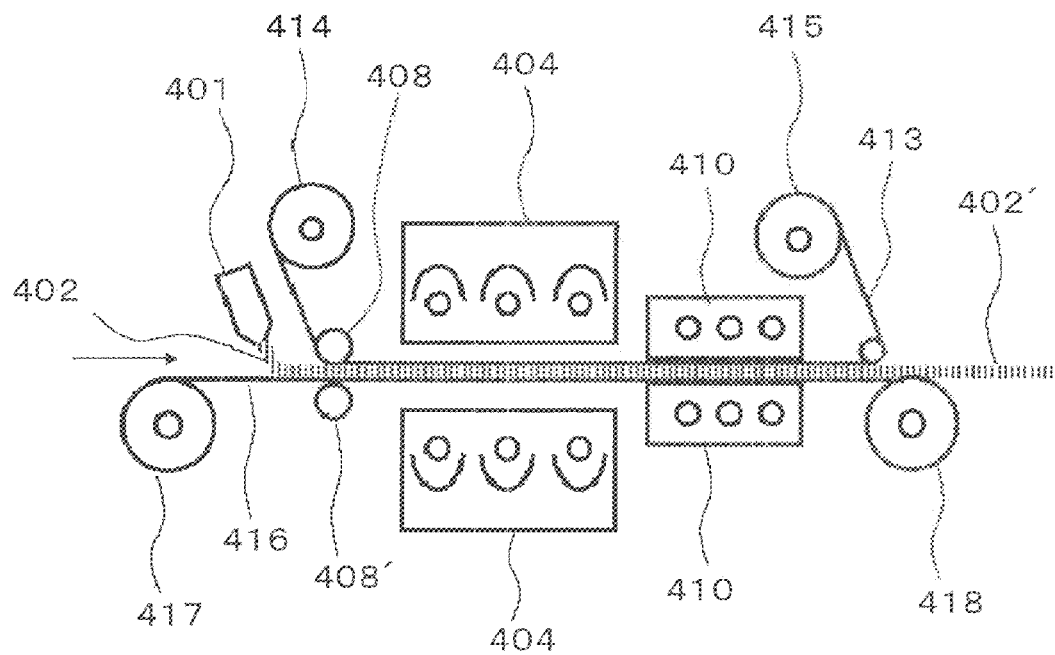
FIG.12
[Ex.1]
 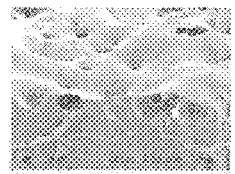
a) Surface (x500)  b) Cross Section (x4,000)
[Com.Ex.1]
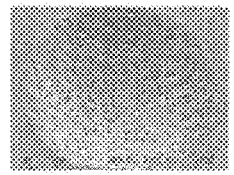 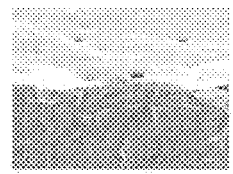
a) Surface (x500)  b) Cross Section (x4,000)
[Ex.2]
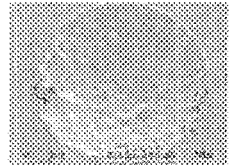 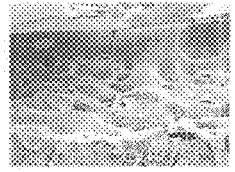
a) Surface (x500)  b) Cross Section (x2,000)
[Com.Ex.2]
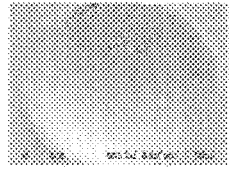 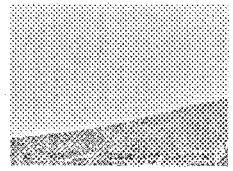
a) Surface (x500)  b) Cross Section (x4,000)
[Ex.3]
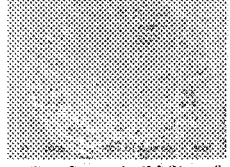 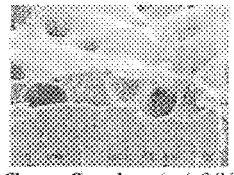
a) Surface (x500)  b) Cross Section (x4,000)
[Com.Ex.3]
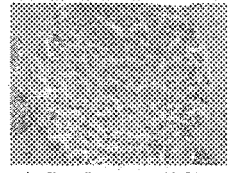 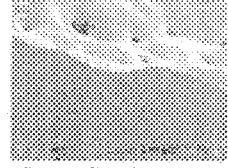
a) Surface (x500)  b) Cross Section (x4,000)

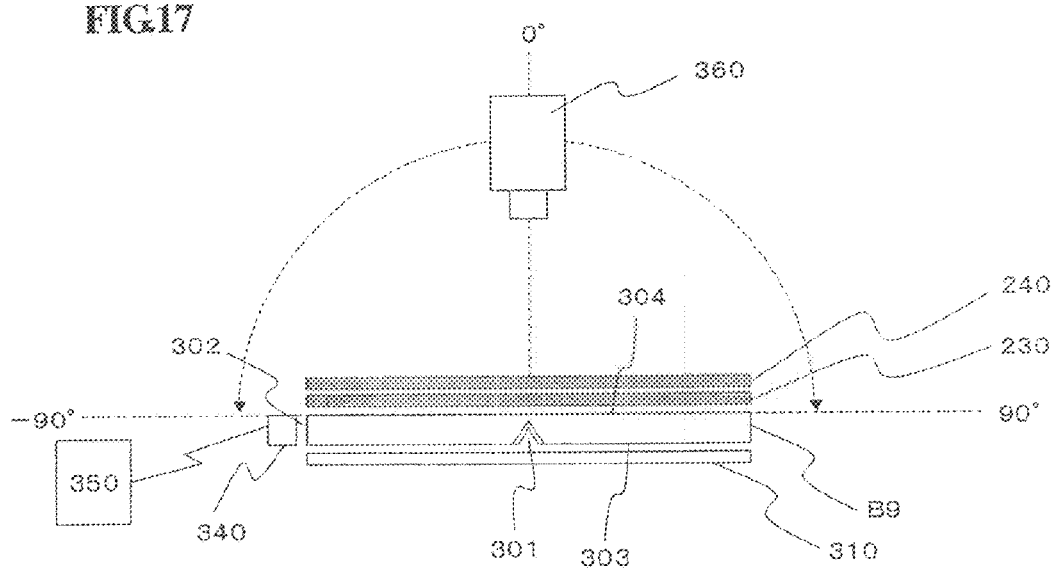

a) Light Guide B11　Surface (×1,000)

b) Light Guide B11　Cross Section (×4,000)

c) Light Guide B12　Surface (×1,000)

d) Light Guide B12　Cross Section (×4,000)

SURFACE LIGHT SOURCE DEVICE, LIGHT GUIDE ELEMENT USED FOR SURFACE LIGHT SOURCE DEVICE, AND METHOD FOR PRODUCING LIGHT GUIDE ELEMENT

TECHNICAL FIELD

The present invention relates to an edge-light-type surface light source device and a light guide used to constitute the surface light source device and, more particularly, to a light guide for surface light source device characterized by its light emission structure formed on a main surface thereof, a production method therefor, and a surface light source device using the light guide.

A surface light source device embodied by using a light guide of the present invention is suitably applied to a backlight of a liquid crystal display device used as, e.g., a display section of a monitor of a mobile (notebook) personal computer or a liquid crystal TV.

BACKGROUND ART

A liquid crystal display device is basically constituted by a backlight and a liquid crystal display element or liquid crystal display panel. As the backlight, an edge-light-type backlight is commonly used in terms of miniaturization of the liquid crystal display device. In the edge-light-type backlight, at least one edge surface of a rectangular light guide is used as a light incident surface. Along the light incident edge surface, a linear or rod-like primary light source such as a straight tube fluorescent lamp or a point-like primary light source such as a light-emitting diode (LED) is disposed. Light emitted from the primary light source is made to enter the light incident edge surface of the light guide, introduced inside the light guide, and then emitted from a light emitting surface which is one of two main surfaces of the light guide. The light emitted from the light emitting surface of the light guide is diffused by a light diffusing element such as a light diffusing film disposed on the light emitting surface and a light deflecting element such as a prism sheet to be deflected to a required direction. Light is also emitted from a rear surface which is the other main surface of the two main surfaces of the light guide. In order to return this light to the light guide, a light reflecting element such as a light reflecting sheet is disposed opposite to the rear surface.

A light emitting mechanism or light emitting structure serving as an optical function structure for emitting, as needed, the light guided inside the light guide is formed in the light emitting surface or rear surface of the light guide. For example, as the light emitting mechanism, a fine concavo-convex structure like a moderately roughened surface or a lens array forming surface obtained by arranging a large number of elongated lenses is used.

As a method for forming such a fine concavo-convex structure, there is known a method that press-molds a translucent material such as an acrylic resin by using a molding machine including a molding member having a shape transfer surface formed by blasting or cutting (see PTL 1 and PTL 2).

Further, there is also a method that directly processes the translucent material to thereby form the light emitting mechanism. For example, PTL 3 discloses a light guide having a plurality of grooves as the fine concavo-convex structure which is obtained by irradiating a light guide surface with laser light in a scanning manner.

Further, there is also known a method that uses a light scattering agent or bubble as the light emitting mechanism.

For example, PTL 4 discloses a light guide made of a foamed material foamed by application of radiation energy and heat energy.

CITATION LIST

Patent Literature

{PTL 1} International Publication No. 2005/073625
{PTL 2} JP-A-2009-266830
{PTL 3} JP-A-2007-87638
{PTL 4} JP-A-2006-155937

SUMMARY OF INVENTION

Technical Problem

In order to produce the light guide having the fine concavo-convex structure by the press molding described in PTL 1 and PTL 2, a molding member needs to be produced. Further, when it is necessary to change a configuration of the fine concavo-convex structure to be formed on the surface of the light guide, the molding member also needs to be replaced with another one, complicating the work and consuming much time, which may result in a reduction in production efficiency.

When the fine concavo-convex structure transfer surface is formed on the molding member by blasting, blasting is (1) strongly or (2) densely applied to a region remote from the light incident edge surface rather than a region close thereto in order to obtain uniform light emission over the entire light emitting surface of the light guide. Then, blast marks at the region remote from the light incident edge surface become (1) deeper or (2) more overlapped than those at the region close to the light incident edge surface, resulting in a change in an inclination angle of a light receiving surface of the light emitting mechanism, so that a light emission direction from the light emitting surface differs between the region remote from the light incident edge surface and region close to the light incident edge surface.

When a fine concavo-convex structure transfer surface including repeated smooth concaves (e.g., arrangement of a large number of elongated lenses) is to be formed in a molding member by cutting, setting an inclination angle of the concave to a required value allows easy control of a light emission direction from the light emitting surface of the light guide. However, in this case, a distribution of emission angles of light emitted from the light emitting surface of the light guide becomes peaky (concentrated in a narrow angle region), resulting in a narrow viewing angle. As a result, when a surface light source device is constituted or produced by combining the light guide and various optical sheets, a light emission intensity of the concaves formed as the light emitting mechanism is higher than that of its surrounding portion, so that the concaves are likely to be seen through. Thus, in order to obtain a high emission quality surface light source device in which light is emitted uniformly over the entire light emitting surface of the light guide, the concaves need to be formed finely and densely.

Light diffusion of the conventional fine concavo-convex structure is caused based only on a surface profile of a main surface of the light guide, resulting in insufficient diffuseness, and when widening of an angular distribution of light to be emitted from the surface light source device is required, a light diffusing element needs to be disposed on the light emitting surface of the light guide.

As a method for enhancing the diffuseness of the light emitting mechanism, PTL 3 proposes a method that forms a groove having fine holes on a surface thereof. Although the use of this technique achieves a wider angular distribution of the emitted light than in the case of the light guide having the light emitting mechanism having a smooth surface, the diffuseness is not sufficient since the light diffusion is caused based only on the fine concavo-convex on the groove surface.

In a light guide disclosed in PTL 4, light emission is made based on light diffusion caused by a foaming part. To produce this light guide, a specific foaming agent needs to be added. In this technique, although the angular distribution of the emitted light can be widened due to the light diffusion by the foaming part, an angle of a boundary (boundary surface) between the foaming part and other parts cannot be set to a desired value, making it impossible to set a direction of the light to be emitted from the light emitting surface of the light guide to a desired one.

In view of the above technical problems, an object of the present invention is to provide a light guide for surface light source device having a light emitting mechanism based on a new light-diffusing function.

In view of the above technical problems, another object of the present invention is to provide a light guide for surface light source device capable of setting a direction of light to be emitted from the light emitting surface to a desired one.

In view of the above technical problems, still another object of the present invention is to provide a light guide for surface light source device capable of being produced without use of a molding machine using a molding member.

Yet still another object of the present invention is to provide a method advantageous for production of the light guide for surface light source device and a surface light source device using the light guide for surface light source device.

Solution to Problem

According to a first aspect of the present invention, in order to achieve any of the above objects, there is provided a plate-like light guide [or light guide element] for surface light source device including: a light incident edge surface or light incident end surface, a light emitting surface [or light exit surface], and a rear surface [or underside surface] on the opposite side to the light emitting surface. A foamed surface layer is formed in at least one of the light emitting surface and rear surface at at least a part thereof. The foamed surface layer contains bubbles, and a cross section thereof including a normal direction with respect to the light emitting surface or rear surface has a concave shape.

In the first aspect of the present invention, a thickness of the foamed surface layer may be 1 µm to 50 µm. In the first aspect of the present invention, the foamed surface layer may contain bubbles each having a diameter of 1 µm to 50 µm. In the first aspect of the present invention, the part at which the foamed surface layer is formed may be a dot shape area of one of the light emitting surface and rear surface. In the first aspect of the present invention, the part at which the foamed surface layer is formed may be a line shape area of one of the light emitting surface and rear surface. In the first aspect of the present invention, the foamed surface layer and a part of the light guide other than the foamed surface layer may be formed of an acrylic resin.

Further, according to a second aspect of the present invention, in order to achieve any of the above objects, there is provided a surface light source device including the above light guide for surface light source device and a primary light source disposed adjacent to the light incident edge surface of the light guide.

In the second aspect of the present invention, the surface light source device may further include a light reflecting element disposed adjacent to the rear surface of the light guide. In the second aspect of the present invention, the surface light source device may further include a light deflecting element disposed adjacent to the light emitting surface of the light guide. In the second aspect of the present invention, the light deflecting element may have a light incidence surface on a side close to the light guide and a light emission surface on a side opposite to the light incidence surface, and the light emission surface may include a plurality of elongated prisms or prism arrays arranged in parallel to each other.

Further, according to a third aspect of the present invention, in order to achieve any of the above objects, there is provided a method of producing the above light guide for surface light source device including: producing a plate-like light guide material formed of an acrylic resin plate by a continuous plate making method; and applying laser etching to at least some part of at least one of main surfaces of the plate-like light guide material to form the foamed surface layer.

In the third aspect of the present invention, the laser used in the laser etching may be infrared laser.

Advantageous Effects of Invention

According to the present invention, the foamed surface layer of the light guide has an optical function that allows light being guided to be emitted from the light emitting surface. Especially, the bubbles are formed only in the vicinity of the surface of the concave portion, and a gas having a refractive index significantly different from that of the light guide material is contained in the bubbles, so that a large light diffusing effect can be obtained. Thus, a light guide for surface light source device having a light emitting mechanism based on a novel light-diffusing function is provided.

Further, according to the present invention, it is possible to produce the light guide for surface light source device without use of a molding machine using a molding member, and it is possible to easily and quickly modify a shape of the foamed surface layer by changing laser etching conditions.

Further, according to the present invention, the foamed surface layer is localized on the slope of the concave portion, so that a wide viewing angle and high emission quality can be obtained by scattering of light. Further, appropriately setting an inclination angle of the slope allows light to be emitted in a desired direction. Further, forming the concave portion in which the foamed surface layer is localized on the slope thereof over the entire main surface of the light guide allows light to be emitted easily in the same direction from the entire light emitting surface of the light guide. Further, it is possible to form the concave portion in which the foamed surface layer is localized on the slope thereof by a simple way.

BRIEF DESCRIPTION OF DRAWINGS

{FIG. 6} A SEM plan view, which is a view for comparison with FIG. 3, showing a laser etched part of the light guide material formed of an acrylic resin plate obtained by extrusion molding.

{FIG. 7} A SEM cross-sectional perspective view, which is a view for comparison with FIG. 4, showing the laser etched part of the light guide material formed of the acrylic resin plate obtained by extrusion molding.

{FIG. 8} Schematic views of the light guide for surface light source device.

{FIG. 11} A schematic configuration view illustrating an example of an apparatus used for producing a plate-like light guide material used in producing the light guide for surface light source device according to the present invention.

{FIG. 12} A view showing observation results of a concave portion corresponding to the light emitting mechanism of each of the light guides for surface light source device produced in Examples 1 to 3 and Comparative Examples 1 to 3.

{FIG. 17} An explanatory view illustrating a method of evaluating optical characteristics of the surface light source device.

{FIG. 18} A view illustrating observation and evaluation results of the concave portion corresponding to the light emitting mechanism of each of the light guides for surface light source device produced in Examples 5 to 7 and Comparative Examples 5 to 7.

DESCRIPTION OF EMBODIMENTS

An exemplary embodiment of the present invention will be described below with reference to the accompanying drawings.

Figure 1:
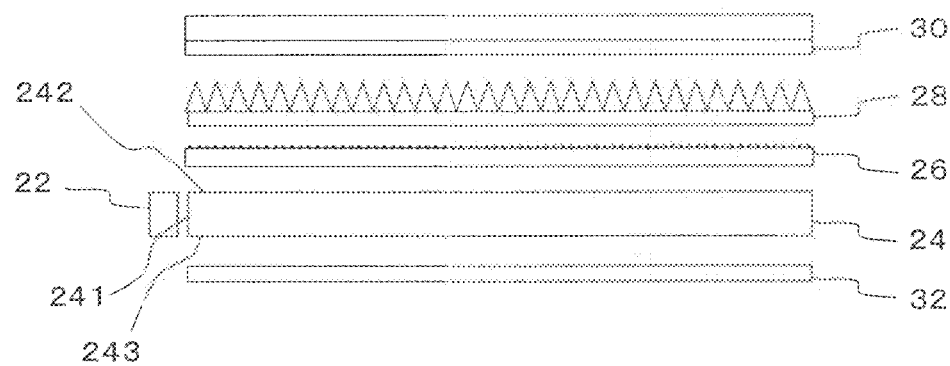
{FIG. 1} A schematic configuration view illustrating an exemplary embodiment of a surface light source device according to the present invention.
Figure 2:
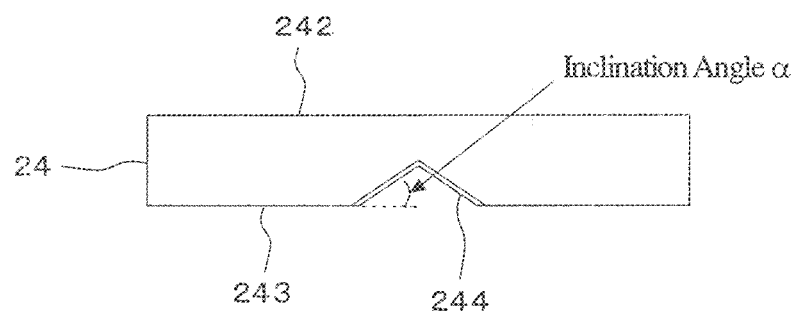
{FIG. 2} A partially cross-sectional view schematically illustrating a light guide of the surface light source device of FIG. 1.

FIG. 1 is a schematic configuration view of an exemplary embodiment of a surface light source device according to the present invention, and FIG. 2 is a partially cross-sectional view schematically illustrating a light guide of the surface light source device. As illustrated in FIG. 1, the surface light source device according to the present exemplary embodiment includes a LED 22 which is a point-like primary light source, a plate-like light guide 24 that guides light emitted from the LED 22, a light diffusing element 26, a first light deflecting element 28, a second light deflecting element 30, and a light reflecting element 32.

The light guide 24 has a thickness in a vertical direction in FIGS. 1 and 2, a stretch in a direction perpendicular to paper surfaces of FIGS. 1 and 2, and a rectangular plate shape as a whole. The light guide 24 has four side surfaces or edge surfaces. At least one of at least a pair of two side surfaces serves as a light incident edge surface 241, and the LED 22 is adjacently disposed so as to face the light incident edge surface. A top surface of the light guide 24 which is one of two main surfaces substantially perpendicular to the light incident edge surface 241 serves as a light emitting surface 242. In the present exemplary embodiment, the light emitting surface 242 is formed as a smooth surface (mirror surface) but is not limited thereto. For example, the light emitting surface 242 may have a prism shape, a lenticular lens shape, a micro lens shape, or the like.

The LED 22 may be provided in plural. In this case, the plurality of LEDs 22 are arranged at appropriate intervals in the direction perpendicular to the paper surface of FIG. 1 and preferably arranged such that directions of maximum intensity light to be emitted from the LEDs are parallel to each other.

A light emitting mechanism is formed on the main surface (rear surface) 243 of the light guide 24 on the opposite side to the light emitting surface 242. The light emitting mechanism has a foamed surface layer 244 formed in some part of the rear surface 243. A cross section (vertical cross section) of the foamed surface layer 244 including a normal line with respect to the light emitting surface 242 or rear surface 243 assumes a concave shape.

Figure 3:
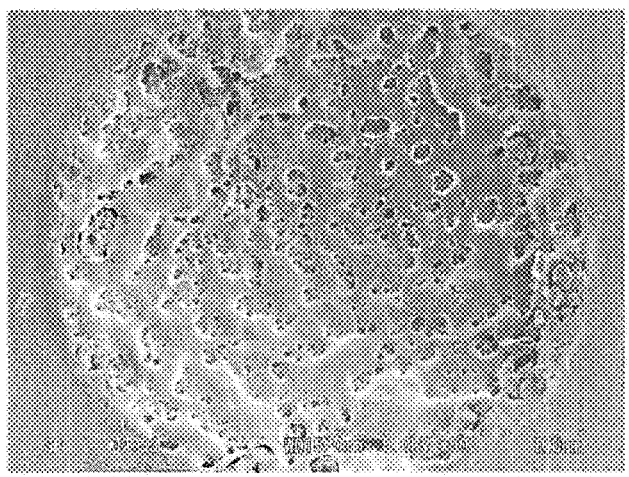
{FIG. 3} A SEM plan view showing a foamed surface layer formed on a rear surface of the light guide of the surface light source device of FIG. 1.
Figure 4:
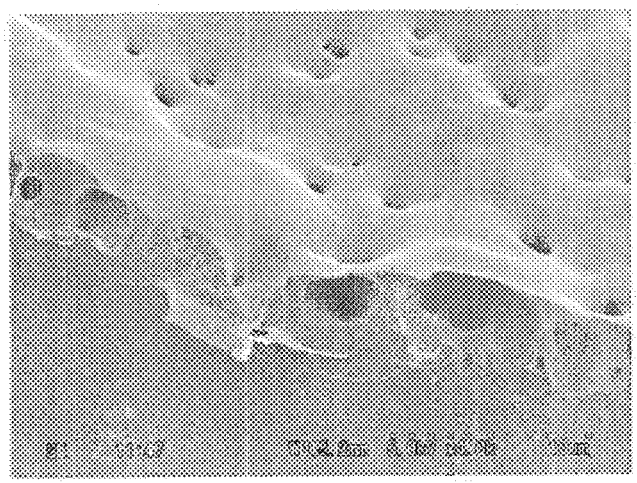
{FIG. 4} A SEM cross-sectional perspective view showing the foamed surface layer formed on the rear surface of the light guide of the surface light source device of FIG. 1.

FIG. 3 is a SEM plan view showing an example of the foamed surface layer 244, and FIG. 4 is a SEM cross-sectional perspective view thereof. The foamed surface layer 244 is formed as a plurality of dots on the rear surface 243. Each dot has a diameter of, e.g., 30 μm to 1,000 μm and a depth of, e.g., 0.1 μm to 500 μm, and an inclination angle of a slope illustrated in FIG. 2 is, e.g., 1° to 70°.

The foamed surface layer 244 is not limited to the dot shape, but may be a stripe shape (i.e., a line shape or a band shape). In this case, the description of the shape of the cross section (vertical cross section) made in the case where the foamed surface layer 244 is formed into the dot shape can be applied to a shape of a cross section (vertical cross section) perpendicular to an extending direction of the stripe pattern.

The foamed surface layer 244 can be formed by applying laser etching in a manner as described later to a plate-like light guide material formed of an acrylic resin plate. Thus, the foamed surface layer 244 and a part of the light guide 24 other than the foamed surface layer 244 are formed of an acrylic resin.

The vertical cross-sectional shape (profile) of the foamed surface layer 244 can be changed by changing an output power of laser, a scanning speed thereof, and a distance of a focal point (focus position) thereof, with respect to the main surface of the light guide material, during a production method as described later.

The foamed surface layer 244 contains a number of bubbles each of which contains gas having a refractive index significantly different from that of the light guide material. As a result, the foamed surface layer 244 functions as an inhomogeneous layer in terms of transmission and reflection of light and acts as a light diffusion layer from the viewpoint of its optical property. Thus, light entering the light incident edge surface 241 and guided inside the light guide is diffused and reflected at the foamed surface layer 244, and part of the diffused and reflected light travels toward the light emitting surface 242 at an angle allowing emission from the light emitting surface 242 and is then emitted from the light emitting surface 242.

Formation of the foamed surface layer 244 as described above on a part of the rear surface 243 of the light guide causes light having a somewhat broad directivity in a distribution in a plane including both a normal-line direction of the light emitting surface 242 (vertical direction in FIGS. 1 and 2) and a direction perpendicular to the light incident edge surface 241 to be emitted from the light emitting surface 242. Thus, it is possible to obtain a light guide for surface light source device in which a wide viewing angle is ensured, the light emitting mechanism part is less visually noticeable, and quality level can easily be adjusted.

A thickness of the foamed surface layer 244 is preferably in a range of 1 μm to 50 μm, and a diameter of each bubble contained in foamed surface layer 244 is preferably in a range of 1 μm to 50 μm.

When the diameter of the bubble contained in the foamed surface layer 244 is too small, a scattering intensity of light propagating inside the light guide 24 exhibits wavelength dependence, resulting in an occurrence of a color shift phenomenon in which color tone of emitted light differs between a region remote from the light incident edge surface 241 of the light guide 24 and a region close to the light incident edge surface 241. On the other hand, when the diameter of the bubble contained in the foamed surface layer 244 is too large, a surface area of the bubble is reduced, leading to a reduction in diffusion efficiency.

When the thickness of the foamed surface layer 244 is too small, the diameter of the bubble contained in the foamed surface layer 244 becomes inevitably too small, so that the same disadvantage as in the case where the diameter of the bubble is too small results. On the other hand, in a case where the thickness of the foamed surface layer 244 is too large and where the diameter of the bubble is too large, the same disadvantage as that in the above description results, and in a case where the thickness of the foamed surface layer 244 is too large and where the diameter of the bubble is appropriate, an emission rate at the foamed surface layer becomes too high, making it difficult to obtain balanced luminance over the entire light guide 24.

When the concave portion is formed by the laser etching, the foamed surface layer 244 is localized in the vicinity of a surface of the concave portion, so that a part of the bubble is exposed to the surface to make the surface of the concave portion be fine concavo-convex. Thus, a foamed state of the foamed surface layer 244 has a correlation with a surface roughness of the concave portion, that is, the larger the number of bubbles, the larger the surface roughness tends to be.

A region corresponding to the foamed surface layer 244 on the rear surface 243 may be provided in plural. In a case where the foamed surface layer 244 is formed into the dot shape, a distribution pattern thereof may be made to be a random pattern, a grid pattern, or a close packing pattern. In a case where the foamed surface layer 244 is formed into the stripe shape, a distribution pattern thereof may be made to be a parallel stripe pattern. Further, the region corresponding to the foamed surface layer 244 may be formed over the entire rear surface 243.

As the light emission mechanism of the light guide 24, a structure obtained by mixing and dispersing light diffusing particles inside the light guide 24 can be used in combination with the foamed surface layer 244 formed on the rear surface 243. Further, although the light guide 24 is formed into a plate-like shape having a uniform thickness (here, the concave shape of the foamed surface layer 244 on the rear surface 243 is ignored) as a whole as shown in FIGS. 1 and 2, it may be formed to have various cross section shapes such as a wedge-like shape whose thickness gradually decreases from the light incident edge surface 241 toward an opposite edge surface or end surface.

The light emission mechanism including the foamed surface layer 244 can be formed on the light emitting surface 242. Further, light emission mechanism including the foamed surface layer 244 can be formed on both the light emitting surface 242 and rear surface 243.

A thickness of the light guide 24 is, e.g., 0.1 mm to 10 mm.

The light diffusing element 26 is disposed on the light emitting surface 242 of the light guide 24 and is formed of, e.g., a light diffusing film. In a case where directivity of light emitted from the light emitting surface 242 has a desired emission angle and viewing angle, the light diffusing element 26 may be omitted.

The first light deflecting element 28 is disposed on the light diffusing element 26, and the second light deflecting element 30 is disposed on the first light deflecting element 28. That is, the light diffusing element 26 is interposed between the first light deflecting element 28 and light emitting surface 242 of the light guide 24.

The first and second light deflecting elements 28 and 30 each have a light incidence surface on a side close to the light guide 24 and a light emission surface on a side opposite to the light incidence surface. The light emission surface includes a plurality of elongated prisms or prism arrays arranged in parallel to each other. However, an extending direction of the prism arrays of the first light deflecting element 28 and those of the second light deflecting element 30 are perpendicular to each other.

In the present exemplary embodiment, the extending directions of the plurality of prism arrays on the light emission surfaces of the first and second light deflecting elements 28 and 30 are parallel to and perpendicular to the light incident edge surface 241, respectively, but are not limited thereto. Both the extending directions of the plurality of prism arrays on the light emission surfaces of the first and second light deflecting elements 28 and 30 may be oblique to the light incident edge surface 241 and perpendicular to each other.

A thickness of each of the first and second light deflecting elements 28 and 30 is, e.g., 30 μm to 350 μm.

In a case where light emitted from the light emitting surface 242 has a distribution peak in a required direction, the first light deflecting element 28 or second light deflecting element 30 may be omitted.

For example, as the light reflecting element 8, a light reflecting sheet such as a plastic sheet having on a surface thereof a metal deposited reflecting layer, a white sheet containing pigment, or a foamed sheet may be used. Examples of the pigment include titanium oxide, barium sulfate, calcium carbonate, and magnesium carbonate. Preferably, a reflecting member is provided also on edge surfaces or end surfaces other than the edge surface serving as the light incident edge surface of the light guide 24. In a case where an amount of light to be emitted from the rear surface 243 is ignorably small, the light reflecting element 8 may be omitted.

By disposing a liquid crystal display element or liquid crystal display panel on a light emitting surface (light emission surface) of the second light deflecting element 30) of the surface light source device including the LED 22, light guide 24, light diffusing element 26, first and second light deflecting elements 28 and 30 and light reflecting element 32, a liquid crystal display device is obtained. A viewer views the liquid crystal display device from above in FIG. 1 through the liquid crystal display element.

Note that by adjacently disposing a second light diffusing element on the light emission surface of the second light deflecting element 30, it is possible to prevent glare or luminance unevenness that causes image display quality to be degraded to thereby enhance the image display quality.

The following describes an exemplary embodiment of a method for producing the light guide for surface light source device as described above.

First, a light guide material on the main surface of which the foamed surface layer has not been formed is produced. The light guide material is a plate-like material formed of an acrylic resin plate and has a thickness equivalent to that of the light guide 24.

The light guide material is produced by a continuous plate making method (continuous casting method). That is, a methyl methacrylate syrup is successively poured for polymerization into a mold that is constituted by two endless rotating metal belts disposed so as to face each other in a vertical direction and a sealing gasket interposed between the belts at both the sides thereof to thereby obtain a plate.

More specifically, this method is described in JP-A-8-151403 as an acrylic plate polymer production method. In this method, at least one polymerization initiator is added to a methyl methacrylate syrup having a viscosity of 100 P or above at 20° C. and having a polymer content of 25 wt % to 60 wt %. The resulting syrup is fed to a mold and heated to 50° C. to 100° C. After the polymer content of the syrup reaches at least 70 wt %, polymerization is performed using autogenous polymerization heat at a temperature almost equal to or less than the temperature of the syrup during polymerization.

The temperature almost equal to or less than the temperature of the syrup during polymerization is preferably 60° C. to 150° C. Further, a peak temperature of the syrup polymerized using the autogenous polymerization heat is preferably 105° C. to 140° C. Further, the mold is preferably constituted by two endless belts driven in the same direction and at the same speed disposed so as to face each other in a vertical direction and a continuous gasket conveyed while being interposed between the belts at both the sides thereof.

A monomer used in the production of the syrup used in the present invention is a methyl methacrylate monomer or a monomer mixture mainly containing methyl methacrylate. In the case of the monomer mixture, the content of methyl methacrylate monomer is preferably 80 wt % or more.

Examples of the monomer used in combination with methyl methacrylate include: methacrylate such as ethyl methacrylate, propyl methacrylate, butyl methacrylate, cyclohexyl methacrylate, 2-ethylhexyl methacrylate, benzyl methacrylate; acrylic ester such as methyl acrylate, ethyl acrylate, butyl acrylate, cyclohexyl acrylate, 2-ethylhexyl acrylate, benzyl acrylate; styrene; and a-methylstyrene.

Examples of the polymerization initiator used for obtaining the syrup through the polymerization of the monomer include: organic peroxide such as di-isopropyl peroxydicarbonate, t-butyl neodecanoate, t-butyl peroxypivalate, t-hexyl peroxypivalate, lauroyl peroxide, benzoyl peroxide, t-butyl peroxyisopropylcarbonate, t-butyl peroxybenzoate, dicumyl peroxide, di-t-butyl peroxide; and azo compound such as 2, 2'-azobis (2,4-dimethylvaleronitrile), 2, 2'-azobisisobutyronitrile, 1,1'-azobis(1-cyclohexanecarbonitrile), 2, 2'-azobis (2,4,4-trimethylpentane). An additive amount of the polymerization initiator is 0.01 wt % to 0.5 wt % with respect to the monomer in general but may arbitrarily be determined according to a polymerization temperature or a target polymerization conversion rate.

In the course of obtaining the syrup, a molecular weight modifier can be used as needed. Examples of the molecular weight modifier include primary, secondary, or tertiary mercaptan having an alkyl group or a substituted alkyl group, such as n-butylmercaptan, i-butylmercaptan, n-octylmercaptan, n-dodecylmercaptan, s-butylmercaptan, s-dodecylmercaptan, t-butylmercaptan. A use amount of the molecular weight modifier is not especially limited, but is preferably in a range of 0.01 wt % to 0.2 wt % with respect to the syrup.

The syrup produced from the monomer needs to have a viscosity of 100 P or above at 20° C. and have a polymer content of 25 wt % to 60 wt %. When the viscosity of the syrup is below 100 P or the polymer content thereof is below 25 wt %, polymerization time becomes longer. On the other hand, when the polymer content thereof is above 60 wt %, mixing of the polymerization initiator or feeding of the syrup to the mold becomes difficult.

The syrup having the above viscosity and polymer content can be produced by known methods, e.g., those described in JP-B-40-3701, JP-B-47-35307, and JP-B-53-39918.

As the polymerization initiator added to the syrup, the same polymerization initiator as the above polymerization initiator used in obtaining the syrup is used. The additive amount of the polymerization initiator is generally preferably 0.03 wt % to 0.5 wt % with respect to the syrup.

Various additive agents, such as oxidation stabilizer, plasticizer, dye, pigment, or parting agent, may be added as needed to the syrup to be used in the present invention.

As the mold used for obtaining the acrylic plate polymer of the present invention, it is preferable to use molds as described in JP-B-46-41602 and JP-B-47-33495, which are of a type that continuously produces a plate polymer and is constituted by two endless belts driven in the same direction and at the same speed disposed so as to face each other in a vertical direction and a continuous gasket conveyed while being interposed between the belts at both the sides thereof.

Figure 5:
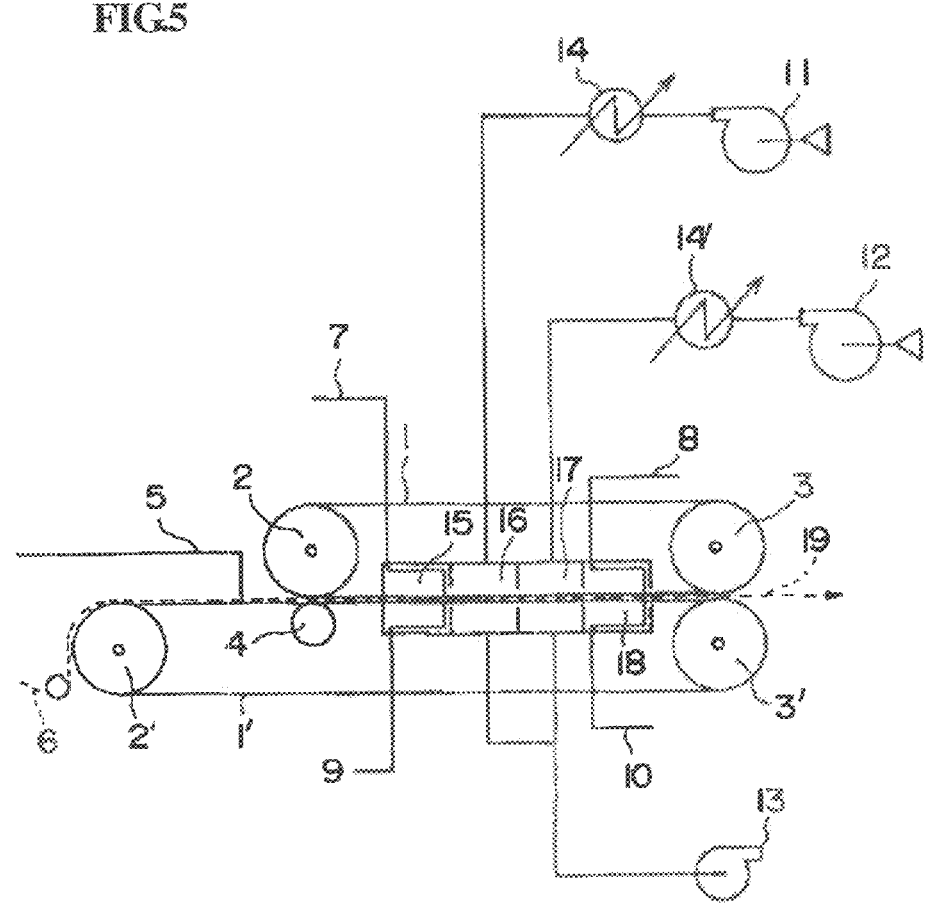
{FIG. 5} A schematic explanatory view illustrating an example of an apparatus used for producing a plate-like light guide material to be used in production of the light guide for surface light source device according to the present invention.

FIG. 5 is a schematic explanatory view illustrating an example of a polymerization apparatus used for continuously producing the acrylic plate polymer (light guide material) of the present invention.

In the polymerization apparatus illustrated in FIG. 5, two stainless endless belts 1, 1' arranged in a vertical direction are stretched over main pulleys 2, 3 and main pulleys 2', 3', respectively, and are driven in the same direction and at the same speed.

A roll 4 horizontally supports the traveling endless belts and regulates a distance between belt surfaces, i.e., a thickness of the syrup.

The syrup is fed from a storage tank to a syrup feed pipe 5 by a not-illustrated proportioning pump and then onto the belt F.

Both the sides of the two belts are sealed by a continuous gasket 6 having elasticity and the gasket is moved while being sandwiched between the belts 1, 1'.

The syrup fed onto the belt 1' is conveyed while being sandwiched between the belts 1, 1' and passed sequentially through heating zones 15, 16, 17, and 18, whereby polymerization thereof is completed to form a plate polymer 19.

In FIG. 5, air heating is performed by means of a steam pipe in the heating zone 15, hot-air heating is performed by means of a blower in the heating zones 16 and 17, and air heating is performed by means of a steam pipe in the heating zone 18. However, a known heating means other than the above, such as water bath heating, electrothermal heating, infrared heating, or induction heating may be used. In the present invention, hot-air heating, electrothermal heating, and infrared heating are preferably used.

As described above, the method of the present invention is implemented by using the polymerization apparatus. In the heating zone 15, the syrup is preheated to 50° C. to 90° C.

In the heating zones 16 and 17, the syrup is polymerized to such a degree that the polymer content becomes at least 70 wt %, preferably, 70 wt % to 90 wt %. In the heating zones 16 and 17, a polymerization temperature of the syrup is kept at a range of 60° C. to 100° C. The polymer content used here is measured in a state where a sample is taken out in the middle of a batch plate production test for quick cooling to stop the polymerization.

In the heating zone 18, the syrup is further polymerized to complete the polymerization. More specifically, in the heating zone 18, the polymerization is performed using autogenous polymerization heat of the syrup with a temperature kept at a value almost equal to or less than the temperature of the syrup during polymerization, preferably, at 60° C. to 150° C. That is, the polymerization heat is aggressively used to complete the polymerization. A polymerization peak temperature of the syrup at this time is 105° C. to 140° C., preferably, 110° C. to 130° C.

In the method of the present invention, when the polymerization is performed using autogenous polymerization heat at a temperature almost equal to or more than the temperature of the syrup during polymerization under a condition that the polymer content is below 70 wt %, bubbles are disadvantageously generated in the plate polymer.

Substantial completion of the polymerization is achieved when the polymer content is 95 wt %, preferably, 95 wt % or above.

Subsequently, etching (laser etching) is performed under laser irradiation onto the main surface of the light guide material thus obtained to form the foamed surface layer 244 on a superficial part of the main surface of the light guide material.

As the laser used in the laser etching, it is preferable to use a laser having high etching efficiency with respect to the light guide material. For example, an infrared laser such as a carbon dioxide laser ($CO_2$ laser) is used. As an example of the $CO_2$ laser, $CO_2$ laser marker (ML-Z9520T, laser emission wavelength: 9.3 μm, average power: 20 W) manufactured by KEYENCE Corporation can be taken.

As described above, the vertical cross-sectional shape (profile) of the foamed surface layer 244 can easily be changed by changing the output power of laser, scanning speed thereof, a distance of a focal point (focus position) thereof, with respect to the main surface of the light guide material.

FIGS. 6 and 7, which are views for comparison with FIGS. 3 and 4, are a SEM plan view and a SEM cross-sectional perspective view each illustrating a laser etched part of the light guide material formed of an acrylic resin plate obtained by extrusion molding. In this case, the foamed surface layer is not formed. It is estimated that in the case where the acrylic resin plate produced by the extrusion molding is used as the light guide material, a molecular weight of the polymer is less than that of the polymer obtained in the case of the present invention, so that the laser etching does not develop the same processing mechanism as that in the present invention.

EXAMPLES

Hereinafter, examples and comparative examples are used to describe the present invention more in detail.

Example 1

<Production of Light Guide Material>

The apparatus illustrated in FIG. 5 was used to produce the light guide material in the following manner according to Example 1 of JP-A-8-151403.

Methyl methacrylate containing 0.016 wt % of 2, 2'-azobis (2,4-dimethylvaleronitrile) and 0.2 wt % of n-dodecylmercaptan, and 4 wt % of butyl acrylate was fed to a polymerization tank by a pump at a flow rate of 6 kg/h, internal fluid in the polymerization tank was sufficiently and uniformly stirred, and polymerization was performed for ten minutes with a temperature kept at 130° C. The polymer content of the polymerization reactant (syrup) on a discharge side was 28 wt %, and the viscosity thereof was 12 P.

The resultant syrup was cooled by a condenser, fed by a gear pump at a flow rate of 4.5 kg/h, and added with a methyl methacrylate syrup whose temperature was kept at 10° C., having a polymer content of 20 wt % and containing 0.32 wt % of t-hexyl peroxypivalate and 0.008 wt % of azobisisobutyronitrile as polymerization initiators at a rate of 0.5 kg/h by a pump, followed by mixing by a mixer incorporating a static mixer.

Then, the resultant syrup was fed at a flow rate of 0.83 kg/h from the feed pipe 5 onto a belt mechanism including the belts 1 and 1' both made of stainless steel and traveling at a speed of 0.04 m per minute, the belt 1 having a thickness of 1.5 mm, a width of 500 mm, and a length of 10 m and belt 1' having a thickness of 1.5 mm, a width of 500 mm, and a length of 12 m. Then the syrup was extended by pressure between the upper and lower belts 1 and 1'. As the gasket 6, a flexible polyvinyl chloride pipe was used. The syrup extended by the belt mechanism was increased in temperature up to 70° C. in the heating zone 15 and then sequentially passed through the heating zone 16 (hot-air heating at 82° C. for four minutes), heating zone 17 (hot-air heating at 69° C. for nine minutes), and heating zone 18 (100° C. for six minutes), whereby a 0.5 mm thickness transparent acrylic cast sheet was obtained.

The obtained acrylic cast sheet was cut into a 30 mm×100 mm rectangular shape to obtain a light guide material A1.

<Production of Light Guide for Surface Light Source Device>

FIGS. 8(a) and 8(b) are schematic views of a sample (light guide B1 for surface light source device) produced in the present example. FIG. 8(a) is a plan view, and FIG. 8(b) is a vertical cross-sectional view. With reference to FIG. 8, a processing process for obtaining the light guide B1 for surface light source device from the light guide material A1, especially, laser etching, will be described. For descriptive purpose, in the following description, parts of the light guide material are referred to by the same names as the corresponding parts of the light guide.

Laser etching was applied to a surface 130 (rear surface of the light emitting surface 110) of the light guide material A1 on an opposite side to a light emitting surface 110 by using $CO_2$ laser marker ML-Z9520T (laser emission wavelength: 9.3 μm, average power: 20 W) manufactured by KEYENCE Corporation under the conditions that an output power was set to 80%, a scanning speed was set to 500 mm/sec, and a laser focal point was adjusted to a surface to be processed to form a light emission mechanism 101 in which a plurality of unit dots each corresponding to a concave foamed surface layer were arranged, whereby the light guide B1 for surface light source device was obtained. The laser etching was performed such that a pattern in which 13 dots were arranged at 0.5 mm pitch in a direction parallel to a light incident edge surface 120 within an area of 6 mm×6 mm centering a position distanced from light incident edge surface by 50 mm and from a side surface or end surface by 15 mm was arranged in 13 rows at 0.5 mm pitch in a direction (direction parallel to the side surface) corresponding to a light guide direction of the light guide.

<Observation and Measurement of Foamed Surface Layer>

A surface profile and a cross section profile of the concave foamed surface layer of the obtained light guide B1 for surface light source device was observed using a scanning-type electron microscope (SEM) (scanning-type electron microscope "S-4300SE/N" manufactured by Hitachi High-Technologies corporation). The observation was performed for a unit dot arbitrarily extracted. Within the observed range, a length in a thickness direction of the light guide from the light guide surface (surface of the unit dot) to a deepest portion of a bubble located at the deepest position in the thickness direction was defined as "thickness of foamed surface layer". Further, the maximum value of a length of the bubble of the foamed surface layer in the thickness direction was defined as "diameter of bubble".

<Measurement of Surface Roughness of Foamed Surface Layer>

A surface roughness (arithmetic average roughness: Ra) of the concave foamed surface layer of the obtained light guide B1 for surface light source device was evaluated using a laser confocal microscope (scanning confocal laser microscope "LEXT OLS-3000" manufactured by OLYMPUS Corporation). The laser confocal microscope was used to measure a three-dimensional profile of the concave foamed surface layer, and analysis software: LEXT OLS application program ver. 5.0.7 was used to extract a surface roughness curve based on the obtained profile to calculate Ra. The measurement was performed for arbitrarily extracted three dots with a cutoff value λc set to 1/10, and an average value of nine data pieces obtained by measuring three points within each of the three dots was regarded as Ra value.

<Optical Evaluation>

(1) Evaluation of Luminance Distribution

Figure 9:
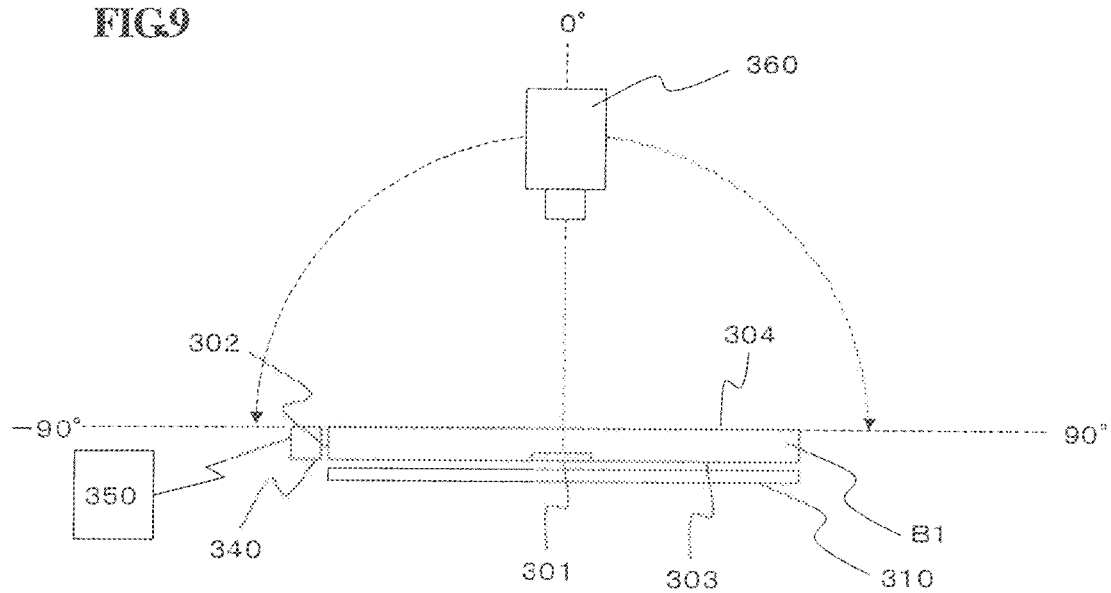
{FIG. 9} An explanatory view of an evaluation method of optical characteristics (luminance distribution) of the surface light source device.

FIG. 9 is a schematic view of a measurement system used in evaluation of a luminance distribution. The luminance distribution of the surface light source device constituted by the light guide B1 for surface light source device was evaluated by the following method.

An LED light source 340 (one LED NSSW020BT manufactured by Nichia Corporation) made to emit light at 20 mA by a constant-current power supply 350 was disposed on a light incident edge surface 302 of a to-be-measured light guide B1 for surface light source device, and a reflecting sheet 310 (UX manufactured by Teijin DuPont Films, thickness: 225 μm) was disposed on a rear surface 303 on an opposite side to the light emitting surface. A luminance meter 360 (Luminance Meter BM-7 manufactured by TOPCON Corporation) was used to measure a luminance distribution of light emitted from a light emitting surface 304 within each area of a viewing angle of 2° from a portion at which the light emitting mechanism 301 was provided as a center in an emitted light angle of −90° to +90° within a plane parallel to the light guide direction and perpendicular to the light emitting surface 304. The emitted light angle was defined such that a normal direction was 0°, a light incident edge surface 302 side (as viewed from the light emitting mechanism 301) was set as − (minus) side, and its opposite side was set as + (plus) side. Based on a result of the measurement, a half-angle width (degree) of the luminance distribution was obtained. An evaluation result will be described later.

(2) Evaluation of Emission Quality

Figure 10:
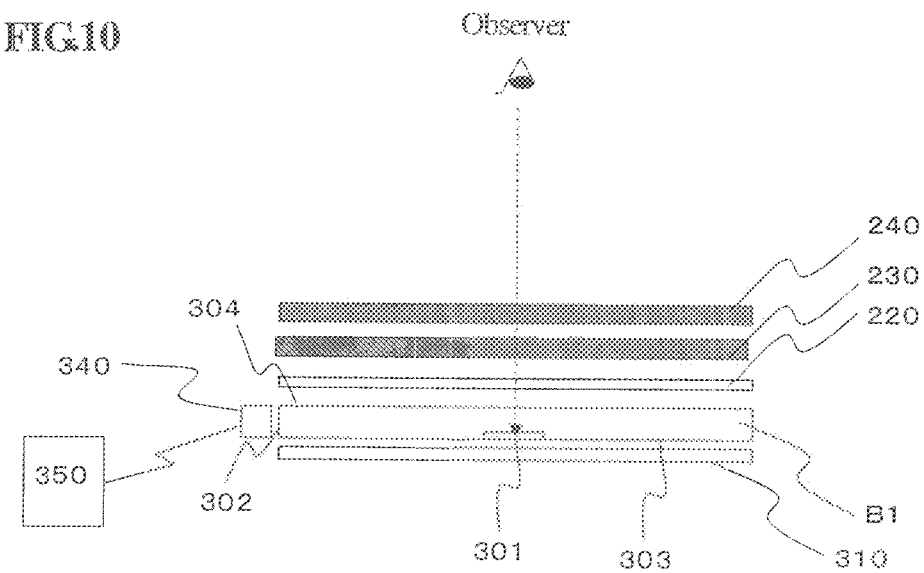
{FIG. 10} An explanatory view of an evaluation method of optical characteristics (emission quality) of the surface light source device.

FIG. 10 is a schematic view of an evaluation system used in emission quality observation. The emission quality of the surface light source device constituted by the light guide B1 for surface light source device was evaluated by the following method.

The LED light source 340 (one LED NSSW020BT manufactured by Nichia Corporation) made to emit light at 20 mA by the constant-current power supply 350 was disposed on the light incident edge surface 302 of the to-be-measured light guide B1 for surface light source device, and the reflecting sheet 310 (UX manufactured by Teijin DuPont Films, thickness: 225 μm) was disposed on the rear surface 303 on the opposite side to the light emitting surface. A diffusion sheet 220 serving as the light diffusing element, as well as prism sheets 230 and 240 serving as first and second light deflecting elements were disposed adjacent to the light emitting surface 304. The prism sheets 230 and 240 were each disposed such that a prism array forming surface faced a side opposite to the light emitting surface 304 of the light guide B1 for surface light source device (i.e., faced upward in FIG. 10). That is, the prism sheets 230 and 240 each have a light incidence surface on a side close to the light guide B1 for surface light source device and a light emission surface on a side opposite to the light incidence surface, and a plurality of prism arrays are formed on the light emission surface. A high luminance diffusion film for LCD backlight "Light-Up 100GM3" manufactured by KIMOTO Co., LTD was used as the diffusing sheet 220 and a luminance enhance film "vikuiti BEFII 90/50" manufactured by Sumitomo 3M Limited was used as the prism sheets 230 and 240. The first prism sheet 230 was disposed such that the prism array thereof and the light incident edge surface 302 of the light guide were parallel to each other, and the second prism sheet 240 was disposed such that the prism array thereof and the light guide direction in the light guide were parallel to each other (that is, the prism array and the light incident edge surface 302 of the light guide were perpendicular to each other).

The LED 340 was made to emit light as in the luminance distribution evaluation described above, and emission quality was evaluated by determining whether a laser dot pattern can be visually confirmed or not. A case where the dots formed by the laser etching can visually be confirmed was evaluated as "×", and a case where the dots formed by the laser etching cannot visually be confirmed and surface light emission can be achieved was evaluated as "○". A result of the evaluation will be described later.

Example 2

An acrylic cast sheet (ACRYLITE LX001 manufactured by Mitsubishi Rayon Co., Ltd.) having a thickness of 0.5 mm was cut into a 30 mm×100 mm rectangular shape to obtain a light guide material A2. The obtained light guide material A2 was used to produce a light guide B2 for surface light source device in the same manner as in Example 1. For the obtained light guide B2 for surface light source device, observation of the concave foamed surface layer, surface roughness measurement, and optical evaluation were performed in the same manner as in Example 1. These results will be described later.

Example 3

FIG. 11 is a schematic configuration view illustrating an apparatus used for continuously producing a plate-like light guide material in the present example. In this apparatus, an ultraviolet-polymerizable viscous liquid (syrup) 402 is supplied from a supply die 401, and an acrylic cast sheet (light guide material) 402' is produced. A feeding device 414 and a wind-up device 415 are used to move a first film 413, and a feeding device 417 and a wind-up device 418 are used to move a second film 416. The supplied ultraviolet-polymerizable viscous liquid (syrup) 2 is held between the first and second films 413 and 416 and nipped between an upper surface pressing roll 408 and a lower surface pressing roll 408' to be shaped into a layer having a required thickness while being moved. Meanwhile, the ultraviolet-polymerizable viscous liquid 402 is irradiated with ultraviolet ray emitted from an ultraviolet irradiation device 404 through the first and second films 413 and 416 and is heated by a hot-air heating device 410. As a result, the ultraviolet-polymerizable viscous liquid 402 is polymerized to be an acrylic cast sheet 402'.

In the present example, a 0.01 wt parts of ultraviolet ray-decomposable polymerization initiator 1-hydroxy-cyclohexyl-phenyl-ketone (Irgacure 184 manufactured by Ciba Specialty Chemicals Inc.), 0.100 wt parts of n-octylmercaptan, and 0.05 wt parts of sodium dioctylsulfosuccinate (AEROSOL OT-100 manufactured by Mitsui-Cyanamid, Ltd.) as a parting agent were added to 60 wt parts of a methyl methacrylate monomer and dissolved at a normal temperature, and then 40 wt parts of methyl methacrylate polymer beads (BR-80 manufactured by Mitsubishi Rayon Co., Ltd.; having weight average molecular weight of 100,000) were dissolved therein by heating over the period of 30 minutes at 80° C., and thus the ultraviolet-polymerizable viscous liquid 402 was prepared. The liquid was left to stand for 2 hours at 50° C. in order to remove foams formed at the time of preparation and then cooled to a normal temperature.

Subsequently, the ultraviolet-polymerizable viscous liquid 402 was used to produce the acrylic cast sheet 402' using the apparatus illustrated in FIG. 11. A polyethylene terephthalate film having a width of 500 mm and a thickness of 188 μm (Cosmoshine A4100 manufactured by Toyobo Co., Ltd.) was used as the first and second films 413 and 416, and FL30S-BL lamp manufactured by Toshiba Corporation was used as the ultraviolet irradiation device 404.

A conveyance speed of the films 413 and 416 was set to 0.13 m/min, and the ultraviolet-polymerizable viscous liquid 402 prepared previously was supplied onto the film 416 in a sheet shape having a width of 400 nun and a thickness of 0.58 mm from the supply die 401, and then the film 413 was laminated thereon. Thereafter, the ultraviolet-polymerizable viscous liquid 402 was irradiated with the ultraviolet ray emitted from the ultraviolet irradiation device 404 with an intensity of irradiation of 2 mW/cm$^2$ for 20 minutes, subjected to heat treatment at 143° C. for 3 minutes by the hot-air heating device 410, cooled to 90° C. by air, and then detached from the films 413 and 416, whereby the acrylic cast sheet 402' having a thickness of 0.5 mm was obtained. The obtained acrylic cast sheet 402' was cut into a 30 mm×100 mm rectangular shape to thereby produce a light guide material A3.

The obtained light guide material A3 was used to produce a light guide B3 for surface light source device in the same manner as in Example 1. For the obtained light guide B3 for surface light source device, observation of the concave foamed surface layer, surface roughness measurement, and optical evaluation were performed in the same manner as in Example 1. These results will be described later.

Comparative Example 1

A light guide material A4 was produced in the same manner as Example 3 except that the additive amount of n-octylmercaptan used in preparation of the ultraviolet-polymerizable viscous liquid 402 was set to 0.135 wt parts.

The obtained light guide material A4 was used to produce a light guide B4 for surface light source device in the same manner as in Example 1. For the obtained light guide B4 for surface light source device, observation of the concave portion, surface roughness measurement, and optical evaluation were performed in the same manner as in Example 1. These results will be described later.

Comparative Example 2

An acryl resin pellet (ACRYPET VH000 manufactured by Mitsubishi Rayon Co., Ltd.) was used as a raw material to produce a 0.5 mm thickness extruded acrylic sheet by a known extrusion process. The extruded acrylic sheet was cut into a 30 mm×100 mm rectangular shape to produce a light guide material A5.

The obtained light guide material A5 was used to produce a light guide B5 for surface light source device in the same manner as in Example 1. For the obtained light guide B5 for surface light source device, observation of the concave portion, surface roughness measurement, and optical evaluation were performed in the same manner as in Example 1. These results will be described later.

Comparative Example 3

The light guide B1 for surface light source device produced in Example 1 was used as a mother die to produce a mold on which a surface profile of the laser dot portion had been transferred by using a molding silicone rubber (TSE 3450 manufactured by Momentive Performance Materials Inc.). Then, ultraviolet curable monomer mixture having a refractive index after curing of 1.51 was developed on a surface of the produced mold, and the light guide A1 used in Example 1 was laminated thereon. Then, the resultant laminated material was irradiated with ultraviolet ray from the light guide A1 side to thereby produce a light guide B6 for surface light source device having the surface profile obtained by transferring the surface profile of the light emitting mechanism part of the light guide B1 for surface light source device.

For the obtained light guide B6 for surface light source device, observation of the concave portion, surface roughness measurement, and optical evaluation were performed in the same manner as in Example 1. These results will be described later.

[Evaluation Results of Examples 1 to 3 and Comparative Examples 1 to 3]

FIG. 12 shows observation results (SEM photographs) of the surface and cross section of the concave portion of each of the light guides (B1 to B6) for surface light source device produced in Examples 1 to 3 and Comparative Examples 1 to 3.

As can be seen from FIG. 12, in the concave light emitting mechanism part formed, by the laser etching, on the main surface of the light guides B1 to B3 for surface light source device produced in Examples 1 to 3, respectively, several micrometers of unevenness is observed on the surface thereof, and a plurality of bubbles are localized in the vicinity of a slope of the cross section thereof. That is, the foamed surface layer has a cracked, sinkhole shaped, or cavity-containing fine structure, and bubbles are contained in the fine structure.

Although the fine unevenness can be observed in the surface of the concave portion of the light guide B4 for surface light source device produced in Comparative Example 1, no bubble is observed in the cross-section thereof. That is, although the unevenness is formed on the surface of the concave portion, the foamed surface layer is not formed therein. Further, in the light guide B5 for surface light source device produced in Comparative Example 2, the surface of the concave portion is smooth, and no bubble is observed in the cross-section thereof. That is, the foamed surface layer is not formed. Further, in the light guide B6 for surface light source device produced in Comparative Example 3, since this light guide B6 for surface light source device is obtained by transferring the shape of the light guide B1 for surface light source device produced in Example 1, the concave portion has the same surface profile. However, no bubble is observed in the cross-section of the concave portion. That is, although the unevenness is formed on the surface of the concave portion, the foamed surface layer is not formed therein.

Figure 13:
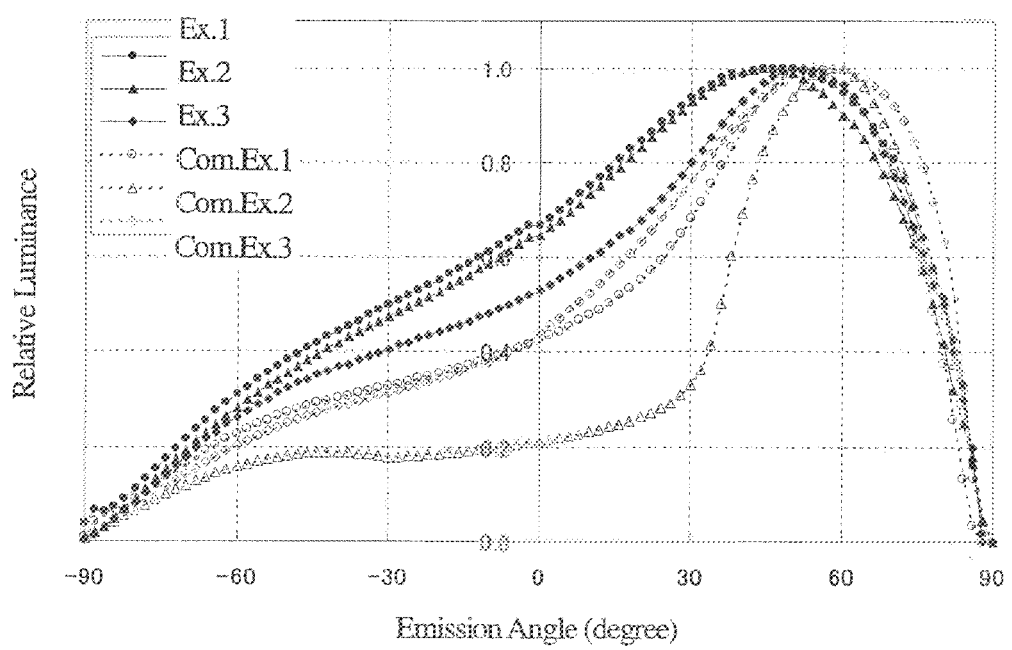
{FIG. 13} A graph illustrating a distribution of luminance at each emission angle obtained by using the light guide (light guides B1 to B6 for surface light source device produced in Examples 1 to 3 and Comparative Examples 1 to 3) alone.

FIG. 13 is a graph illustrating a distribution (luminance distribution measured by the measuring system illustrated in FIG. 9) of luminance at each emission angle obtained by using the light guide (light guides B1 to B6 for surface light source device produced in Examples 1 to 3 and Comparative Examples 1 to 3) alone. Here, for comparison of profiles of the luminance distribution, data standardized with a value of a peak luminance set to 1.0 is illustrated. In FIG. 13, a horizontal axis represents an angle of emitted light (emission angle), and a vertical axis represents a relative luminance level at each emission angle. The emission angle is defined such that the light incident edge surface side (as viewed from the light emitting mechanism) is set as − (minus) side, and its opposite side is defined as +(plus) side.

Table 1 summarizes the thickness of the foamed surface layer and diameter of the bubble which are obtained from the observation of the cross section, the arithmetic average roughness (Ra) which is obtained from the surface roughness measurement, the half-angle width which is obtained from the luminance distribution evaluation, and results of the emission quality evaluation. The half-angle width refers to an angle width assuming a value equal to or more than 50% (relative luminance=0.5) of the peak value in each emission profile of FIG. 13.

As shown in Table 1, the light guides for surface light source device of Examples 1 to 3 each having the foamed surface layer on the surface of the concave portion which is formed by the laser etching each have a broad luminance distribution characteristic with a half-angle width of 80° or above. Especially, the luminance level in the normal direction (0° direction in FIG. 13) is high. Thus, when each of the light guides for surface light source device of Examples 1 to 3 is combined with optical elements to form a surface light source device, the laser dots can be made less visually noticeable, resulting in high quality light emission.

On the other hand, the light guides for surface light source device of Comparative Examples 1 and 2 that do not have the foamed surface layer have luminance distribution characteristics with half-angle widths of 64° and 42°, respectively. These luminance distribution characteristics each represent a narrower (higher in directivity) emission pattern than in the light guides for surface light source device of Examples 1 to 3. Thus, as in the case of the light guides for surface light source device of Examples 1 to 3, when each of the light guides for surface light source device of Comparative Examples 1 and 2 is combined with optical elements to form a surface light source device, the laser dots is easily visually noticeable. In order to prevent the dots from being visually noticeable and obtain high emission quality, the laser dots needs to be made more dense, thus taking a longer time to complete the laser etching, which leads to degradation in productivity. In the light guide B6 for surface light source device produced in Comparative Example 3, since this light guide B6 for surface light source device is obtained by transferring the surface profile of the light guide B1 for surface light source device, the concave portion has a surface roughness equivalent to the B1, but no foamed surface layer exists. Thus, only scattering effect of the surface unevenness can be obtained, but high scattering effect caused by a difference in refractive index from a gas contained in the bubble cannot be obtained. Therefore, the half-angle width becomes significantly narrower than that in Example 1, with the result that the laser dots is easily visually noticeable.

TABLE 1

|  | Example 1 | Example 2 | Example 3 | Comparative Example 1 | Comparative Example 2 | Comparative Example 3 |
| --- | --- | --- | --- | --- | --- | --- |
| Light guide for surface light source device | B1 | B2 | B3 | B4 | B5 | B6 |
| Thickness of foamed surface layer (μm) | 4.9 | 38.4 | 6.2 | Absent | Absent | Absent |
| Diameter of bubble (μm) | 4.9 | 33.6 | 6.2 | Absent | Absent | Absent |
| Ra (μm) | 0.58 | 0.40 | 0.30 | 0.14 | 0.05 | 0.60 |
| Half-angle width (degree) | 110 | 104 | 86 | 64 | 42 | 74 |
| Emission quality | ○ | ○ | ○ | X | X | X |

Example 4

A light guide material A7 was produced in the same manner as Example 3 except that the additive amounts of ultraviolet ray-decomposable polymerization initiator 1-hydroxycyclohexyl-phenyl-ketone and n-octylmercaptan which were used in preparation of the ultraviolet-polymerizable viscous liquid 402 were set to 0.05 wt parts and 0.05 wt parts, respectively.

The obtained light guide material A7 was used to produce a light guide B7 for surface light source device in the same manner as Example 1 except that the laser etching conditions were changed such that a laser focal point was offset by 10 mm from the surface (rear surface 130) to be processed to the laser light source side. For the obtained light guide B7 for surface light source device, observation of the concave foamed surface layer, surface roughness measurement, and optical evaluation were performed in the same manner as in Example 1. However, the emission quality evaluation was performed under the conditions slightly changed from those applied to Example 1. That is, the diffusing sheet and two prism sheets were disposed adjacent to the light emitting surface 304 as in the case of Example 1, and another diffusing sheet (high luminance diffusion film for LCD backlight "Light-Up 100GM3" manufactured by KIMOTO Co., LTD) used in Example 1 was additionally disposed. These results will be described later.

Comparative Example 4

A light guide B8 for surface light source device was produced in the same manner as Example 4 except that the light guide material A5 used in Comparative Example 2 was used. For the obtained light guide B8 for surface light source device, observation of the concave portion, surface roughness measurement, and optical evaluation were performed in the same manner as in Example 4. These results will be described later.

[Evaluation Results of Example 4 and Comparative Example 4]

Figure 14:
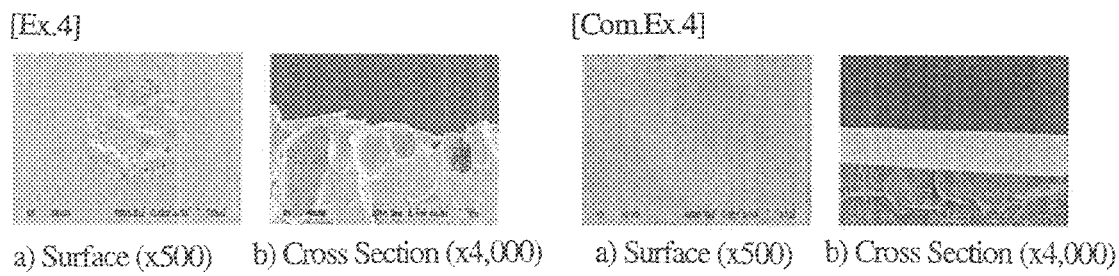
{FIG. 14} A view showing observation results of the concave portion corresponding to the light emitting mechanism of each of the light guides for surface light source device produced in Example 4 and Comparative Example 4.

FIG. 14 shows observation results (SEM photographs) of the surface and cross section of the concave portion of each of the light guides (B7 and B8) for surface light source device produced in Example 4 and Comparative Example 4.

As can be seen from FIG. 14, in the concave light emitting mechanism part formed, by the laser etching, on the main surface of the light guide B7 for surface light source device produced in Example 4, several micrometers of unevenness is observed on the surface thereof, and a plurality of bubbles are localized in the vicinity of a slope of the cross section thereof. On the other hand, the surface of the light emitting mechanism part of the light guide B8 for surface light source device produced in Comparative Example 4 is smooth, and no bubble is observed in the cross-section thereof. That is, the foamed surface layer is not formed.

Figure 15:
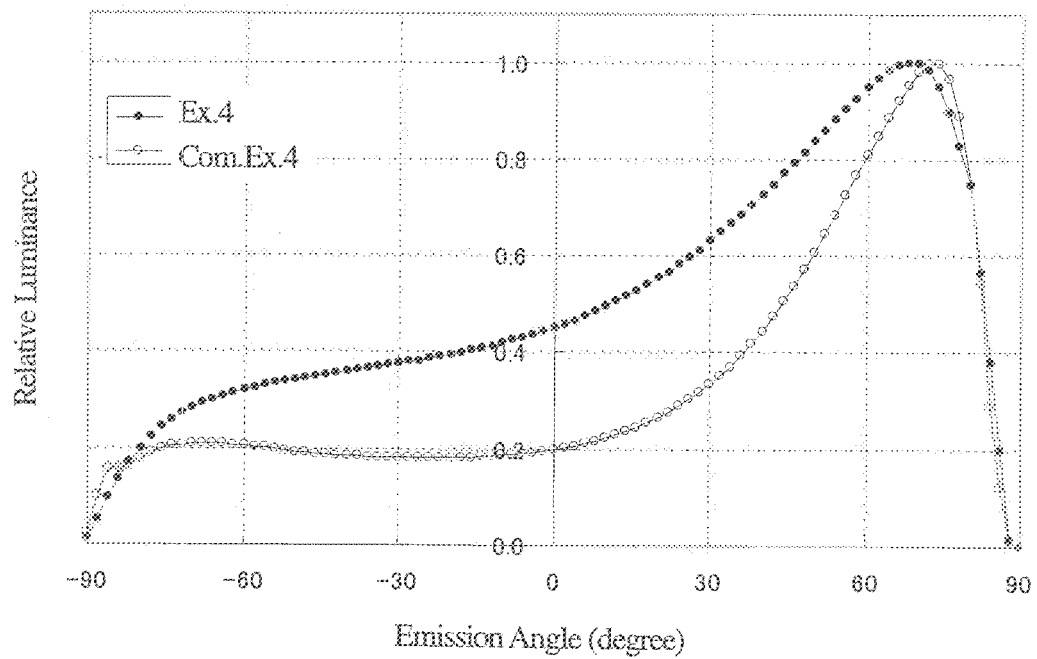
{FIG. 15} A graph illustrating a distribution of luminance at each emission angle obtained by using the light guide (light guides for surface light source device produced in Example 4 and Comparative Example 4) alone.

FIG. 15 is a graph illustrating a distribution of luminance at each emission angle obtained by using the light guide (light guides B7 and B8 for surface light source device produced in Example 4 and Comparative Example 4) alone. Here, for comparison of profiles of the luminance distribution, data standardized with a value of a peak luminance set to 1.0 is illustrated. In FIG. 15, a horizontal axis represents an angle of emitted light (emission angle), and a vertical axis represents a relative luminance level at each emission angle. The emission angle is defined such that the light incident edge surface side (as viewed from the light emitting mechanism) is set as − (minus) side, and its opposite side is defined as + (plus) side.

Table 2 summarizes the thickness of the foamed surface layer and diameter of the bubble which are obtained from the observation of the cross section, the arithmetic average roughness (Ra) which is obtained from the surface roughness measurement, the half-angle width which is obtained from the luminance distribution evaluation, and results of the emission quality evaluation. The half-angle width refers to an angle width assuming a value equal to or more than 50% (relative luminance=0.5) of the peak value in each emission profile of FIG. 15.

As shown in Table 2, the light guide for surface light source device of Example 4 having the foamed surface layer on the surface of the concave portion which is formed by the laser etching has a broad luminance distribution characteristic with a half-angle width of 60°. Especially, the luminance level in the normal direction is high. Thus, when the light guide for surface light source device of Example 4 is combined with optical elements to form a surface light source device, the laser dots can be made less visually noticeable, resulting in high quality light emission.

On the other hand, the light guide for surface light source device of Comparative Example 4 that does not have the foamed surface layer has a luminance distribution characteristic with a half-angle width of 38°. This luminance distribution characteristic represents a narrower (higher in directivity) emission pattern than in the light guide for surface light source device of Example 4. Thus, when the light guide for surface light source device of Comparative Example 4 is combined with optical elements to form a surface light source device as in the case of the light guide for surface light source device of Example 4, the laser dots is easily visually noticeable. In order to prevent the dots from being visually noticeable and obtain high emission quality, the laser dots needs to be made more dense, thus taking a longer time to complete the laser etching, which leads to degradation in productivity.

TABLE 2

|  | Example 4 | Comparative Example 4 |
| --- | --- | --- |
| Light guide for surface light source device | B7 | B8 |
| Thickness of foamed surface layer (μm) | 14.7 | Absent |
| Diameter of bubble (μm) | 14.7 | Absent |
| Ra (μm) | 0.47 | 0.02 |
| Half-angle width (degree) | 60 | 38 |
| Emission quality | ○ | x |

Example 5

<Production of Light Guide for Surface Light Source Device>

An acrylic cast sheet produced in the same manner as Example 1 was cut into a 100 mm×100 mm rectangular shape to produce a light guide material A9.

Figure 16:
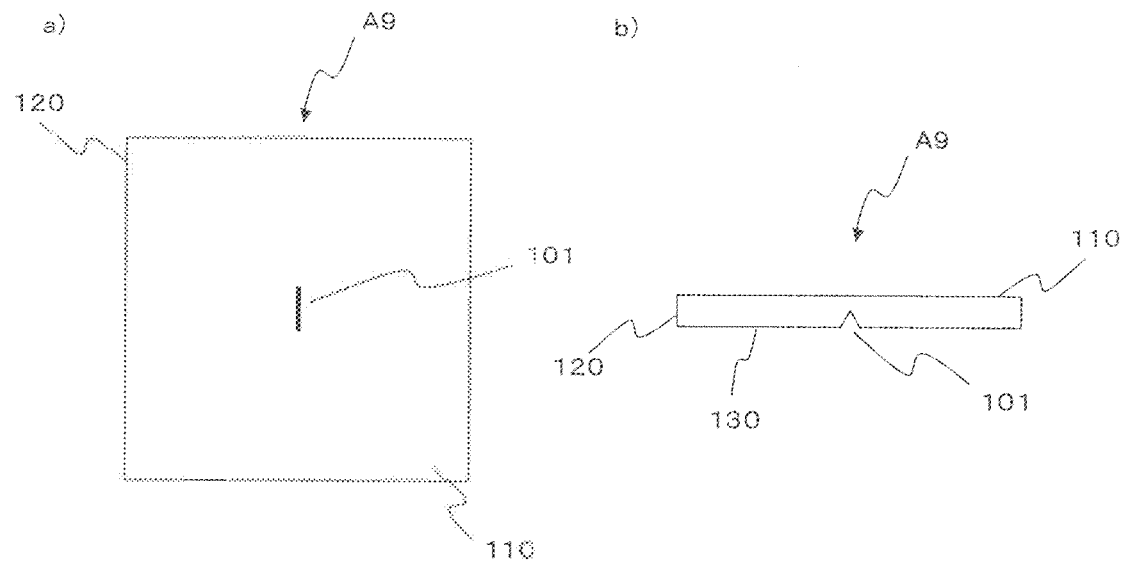
{FIG. 16} Schematic views each illustrating a light guide for surface light source device.

FIGS. 16(a) and 16(b) are schematic views of a sample (light guide B9 for surface light source device) produced, by using the obtained light guide material A9, in the present example. FIG. 16(a) is a plan view, and FIG. 16(b) is a vertical cross-sectional view. With reference to FIG. 16, a processing process for obtaining the light guide B9 for surface light source device from the light guide material A9, especially, laser etching, will be described.

Laser etching was applied to the rear surface 130 of the light guide material A9 on an opposite side to the light emitting surface 110 at a width direction center (vertical direction in FIG. 16(a)) of the rear surface 130 distanced by 50 mm from the light incident edge surface 120 by using $CO_2$ laser marker ML-Z9520T (laser emission wavelength: 9.3 μm, average power: 20 W) manufactured by KEYENCE Corporation under the conditions that an output power was set to 90%, a scanning speed was set to 75 mm/sec, and a laser focal point was offset by 9 mm from the surface (rear surface 130) to be processed to the laser light source side to form a concave portion 101 having a V-groove shaped vertical cross section as the light emitting mechanism. The laser etching was performed such that a stripe pattern parallel to the light incident edge surface 120 having a length of 10 mm was formed.

As a result, a light guide B9 for surface light source device was obtained. A superficial part of the concave portion 101 serves as the foamed surface layer 244.

The shape, width, depth, and inclination angle (light incident edge surface side inclination angle) α of each of the concave portion 101 and foamed surface layer 244 of the obtained light guide B9 for surface light source device were evaluated using an optical microscope (IC Inspection Microscope ECLIPSE L200N manufactured by Nikon Corporation). Evaluation results are shown in FIG. 18.

Further, the shapes of the surface and cross section of a light incident edge surface side slope of each of the concave portion 101 and foamed surface layer 244 were observed using the SEM as in Example 1. Observation results will be described later.

<Optical Evaluation>

A surface light source device was produced using the light guide B9 for surface light source device, and optical characteristics thereof were evaluated as in the manner illustrated in FIG. 17.

Five LEDs 340 (LED NSSW020BT manufactured by Nichia Corporation) serving as a primary light source were disposed adjacent to the light incident edge surface 302 of the light guide B9 for surface light source device at even intervals. Further, a reflecting sheet 310 (Lumirror E20, manufactured by Toray Industries, Inc.) serving as the light reflecting element was disposed adjacent to the rear surface 303 of the light guide B9 for surface light source device so as to be separated from the rear surface 303 with an airspace interposed therebetween.

Figure 20:
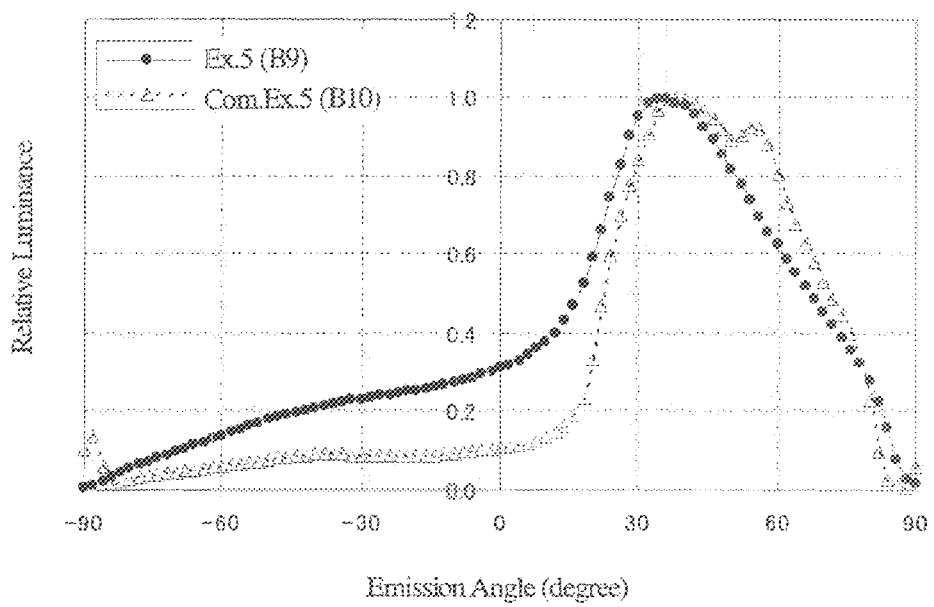
{FIG. 20} A graph illustrating a distribution of luminance at each emission angle obtained by using the light guide (light guide samples B9 and B10 produced in Example 5 and Comparative Example 5) alone.

The LEDs 340 were made to emit light at 20 mA by the constant-current power supply 350, and luminance meter 360 (Luminance Meter BM-7 manufactured by TOPCON Corporation) was used to measure a luminance distribution of light emitted from the light emitting surface 304 within each area of a viewing angle of 2° from a portion at which the light emitting mechanism 301 was provided as a center in an emitted light angle of −90° to +90° within a plane parallel to the light guide direction and perpendicular to the light emitting surface 304. The emitted light angle was defined such that a normal direction was 0°, a light incident edge surface 302 side (as viewed from the light emitting mechanism 301) was set as − (minus) side, and its opposite side was set as + (plus) side. A measurement result is shown in FIG. 20.

Subsequently, the prism sheets 230 and 240 serving as the first and second light deflecting elements were disposed adjacent to the light emitting surface 304. The prism sheets 230 and 240 were each disposed such that a prism array forming surface faced a side opposite to the light emitting surface 304 of the light guide B9 for surface light source device (i.e., faced upward). That is, the prism sheets 230 and 240 each have a light incidence surface on a side close to the light guide B9 for surface light source device and a light emission surface on a side opposite to the light incidence surface, and a plurality of prism arrays are formed on the light emission surface. A luminance enhance film "Vikuiti BEFII 90/50" manufactured by Sumitomo 3M Limited was used as the prism sheets 230 and 240. The first prism sheet 230 was disposed such that the prism array and light incident edge surface 302 of the light guide were parallel to each other, and the second prism sheet 240 was disposed such that the prism array and light guide direction in the light guide were parallel to each other (that is, prism array and light incident edge surface 302 were perpendicular to each other).

Figure 21:
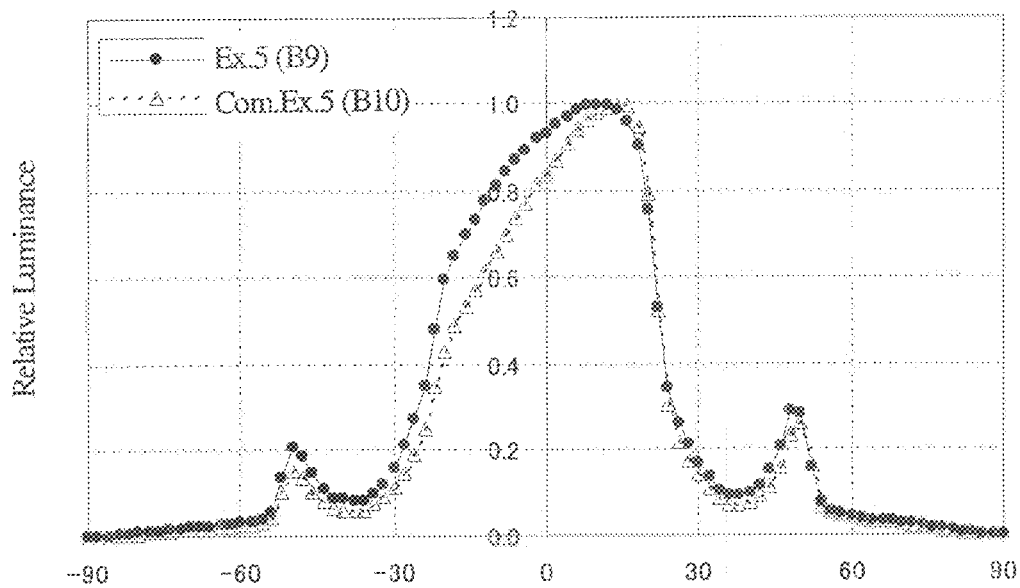
{FIG. 21} A graph illustrating a distribution of luminance at each emission angle obtained when two prism sheets are disposed on the light emitting surface side of each of light guide samples B9 and B10 produced in Example 5 and Comparative Example 5.

The LEDs 340 were made to emit light as described above, and the luminance meter 360 (Luminance Meter BM-7 manufactured by TOPCON Corporation) was used to measure a distribution of luminance at each emission light angle. A measurement result is shown in FIG. 21.

Comparative Example 5

An acrylic resin pellet (ACRYPET VH000 manufactured by Mitsubishi Rayon Co., Ltd.) was used as a raw material to produce a 0.5 mm thickness extruded acrylic sheet by a known extrusion process. The extruded acrylic sheet was cut into a 100 mm×100 mm rectangular shape to obtain a light guide material, and the obtained light guide material was used to produce a light guide B10 for surface light source device in the same manner as in Example 5.

The shape, width, depth, and inclination angle (light incident edge surface side inclination angle) a of the concave portion 101 of the obtained light guide B10 for surface light source device were evaluated in the same manner as in Example 5. Evaluation results are shown in FIG. 18.

Further, the shapes of the surface and cross section of a light incident edge surface side slope of the concave portion 101 were observed in the same manner as in Example 5. Observation results will be described later.

Further, the light guide B10 for surface light source device was used to produce a surface light source device in the same manner as in Example 5, and a distribution of luminance at each emission light angle was measured. A measurement result is shown in FIGS. 20 and 21.

Example 6

A light guide B11 for surface light source device was produced in the same manner as in Example 5 except that the laser etching conditions were changed such that a laser focal point was offset by 7 mm from the surface to be processed to the laser light source side.

The shape, width, depth, and inclination angle (light incident edge surface side inclination angle) α of each of the concave portion 101 and foamed surface layer 244 of the obtained light guide B11 for surface light source device were evaluated in the same manner as in Example 5. Evaluation results are shown in FIG. 18.

Further, the shapes of the surface and cross section of a light incident edge surface side slope of each of the concave portion 101 and foamed surface layer 244 were observed in the same manner as in Example 5. Observation results will be described later.

Figure 22:
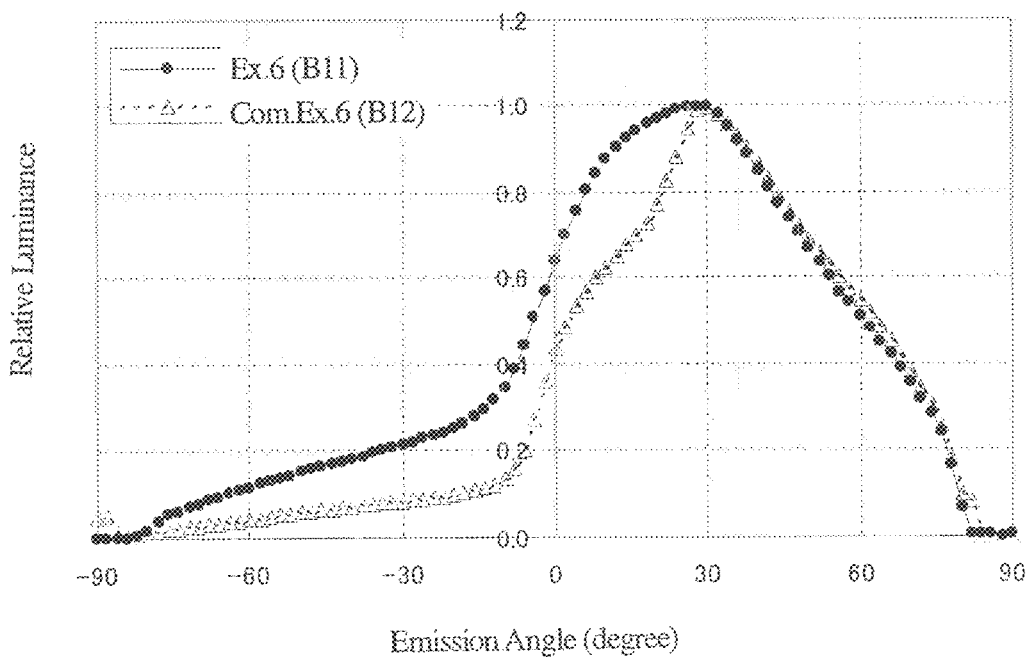
{FIG. 22} A graph illustrating a distribution of luminance at each emission angle obtained by using the light guide (light guide samples B11 and B12 produced in Example 6 and Comparative Example 6) alone.
Figure 23:
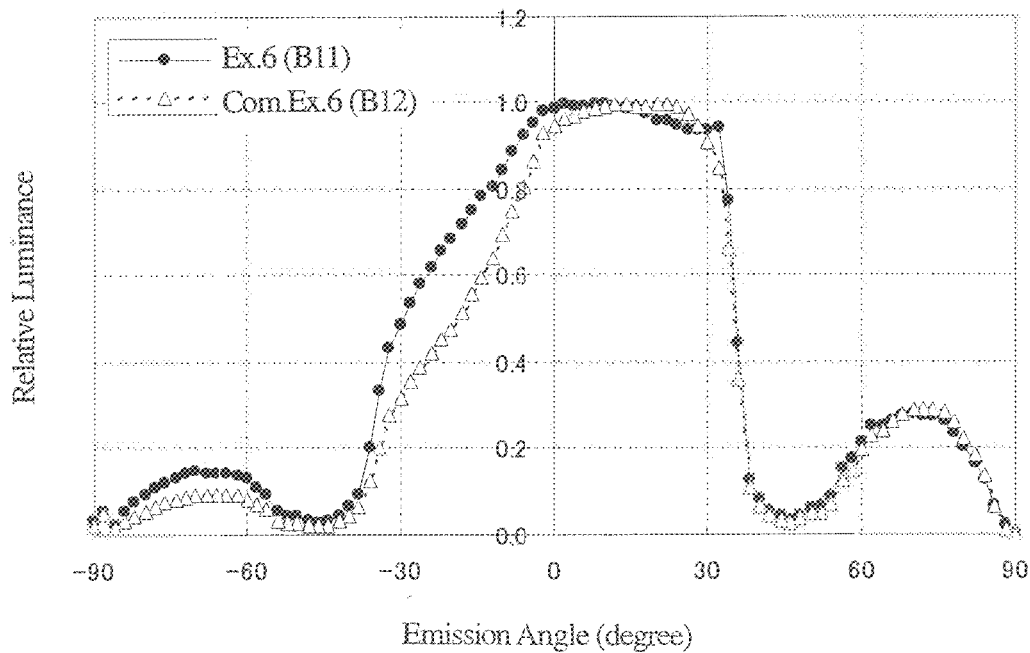
{FIG. 23} A graph illustrating a distribution of luminance at each emission angle obtained when one prism sheet is disposed on the light emitting surface side of each of the light guide samples B11 and B12 produced in Example 6 and Comparative Example 6.

Further, the light guide B11 for surface light source device was used to produce a surface light source device in the same manner as in Example 5, and a distribution of luminance at each emission light angle was measured. In this case, however, the prism sheet 240 was not used. A measurement result is shown in FIGS. 22 and 23.

Comparative Example 6

A light guide B12 for surface light source device was produced in the same manner as in Example 6 except that the extruded acrylic sheet used in Comparative example 5 was used as the light guide material.

The shape, width, depth, and inclination angle (light incident edge surface side inclination angle) α of the concave portion 101 of the obtained light guide B12 for surface light source device were evaluated in the same manner as in Example 5. Evaluation results are shown in FIG. 18.

Further, the shapes of the surface and cross section of a light incident edge surface side slope of the concave portion 101 were observed in the same manner as in Example 5. Observation results will be described later.

Further, the light guide B12 for surface light source device was used to produce a surface light source device in the same manner as in Example 6, and a distribution of luminance at each emission light angle was measured. A measurement result is shown in FIGS. 22 and 23.

Example 7

A light guide B13 for surface light source device was produced in the same manner as in Example 5 except that the laser etching conditions were changed such that the output power was set to 70%, and laser focal point was offset by 2 mm from the surface to be processed to the laser light source side.

The shape, width, depth, and inclination angle (light incident edge surface side inclination angle) α of each of the concave portion 101 and foamed surface layer 244 of the obtained light guide B13 for surface light source device were evaluated in the same manner as in Example 5. Evaluation results are shown in FIG. 18.

Further, the shapes of the surface and cross section of a light incident edge surface side slope of each of the concave portion 101 and foamed surface layer 244 were observed in the same manner as in Example 5. Observation results will be described later.

Figure 24:
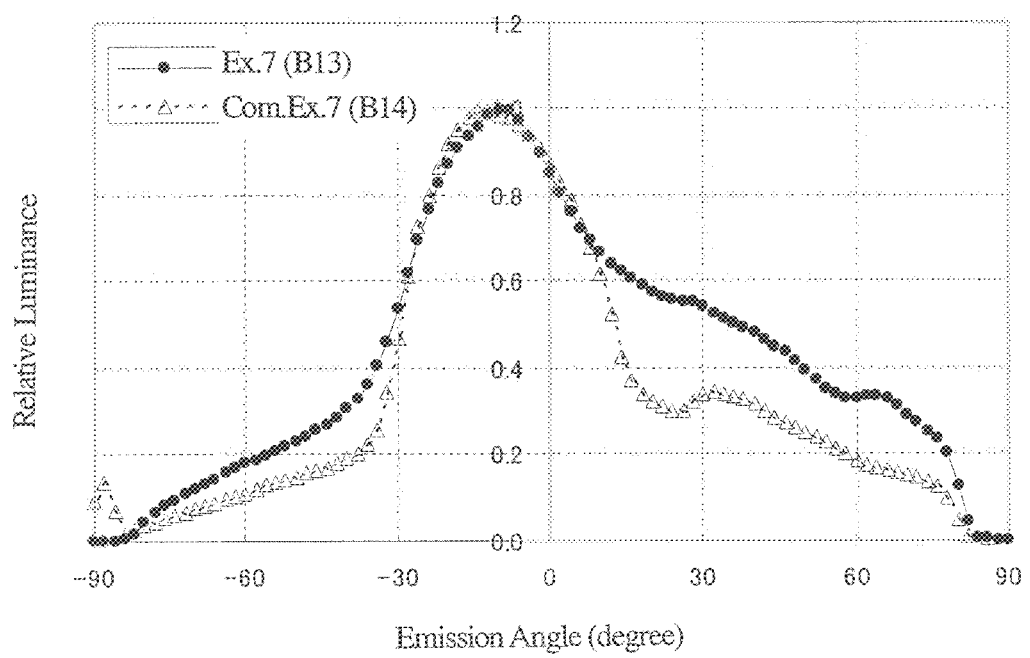
{FIG. 24} A graph illustrating a distribution of luminance at each emission angle obtained by using the light guide (light guide samples B13 and B14 produced in Example 7 and Comparative Example 7) alone.

Further, the light guide B13 for surface light source device was used to produce a surface light source device in the same manner as in Example 5, and a distribution of luminance at each emission light angle was measured. In this case, however, the prism sheets 230 and 240 were not used. A measurement result is shown in FIG. 24.

Comparative Example 7

A light guide B14 for surface light source device was produced in the same manner as in Example 7 except that the extruded acrylic sheet used in Comparative example 5 was used as the light guide material.

The shape, width, depth, and inclination angle (light incident edge surface side inclination angle) α of the concave portion 101 of the obtained light guide B14 for surface light source device were evaluated in the same manner as in Example 5. Evaluation results are shown in FIG. 18.

Further, the shapes of the surface and cross section of a light incident edge surface side slope of the concave portion 101 were observed in the same manner as in Example 5. Observation results will be described later.

Further, the light guide B14 for surface light source device was used to produce a surface light source device in the same manner as in Example 7, and a distribution of luminance at each emission light angle was measured. A measurement result is shown in FIG. 24.

Observation Results of Examples 5 to 7 and Comparative Examples 5 to 7

The "shape" in FIG. 18 shows the observation results of cross sections of the concave portion 101 having the V-groove shaped cross section and foamed surface layer 244 constituting the light emitting mechanism of the light guides (B9 to B14) for surface light source device produced in Examples 5 to 7 and Comparative Examples 5 to 7. The left side slope in FIG. 18 corresponds to the light incident edge surface side.

As can be seen from FIG. 18, by appropriately adjusting the laser etching conditions (laser output power, scanning speed, and focus position), the V-groove shape in which a slope angle has been controlled to a specific angle is formed. Further, in both cases where the light guide material formed of the acrylic cast sheet is used to produce the light guide and where the light guide material formed of the extruded acrylic sheet is used to produce the light guide, the obtained light emitting mechanism parts have substantially the same inclination angle.

Figure 19:
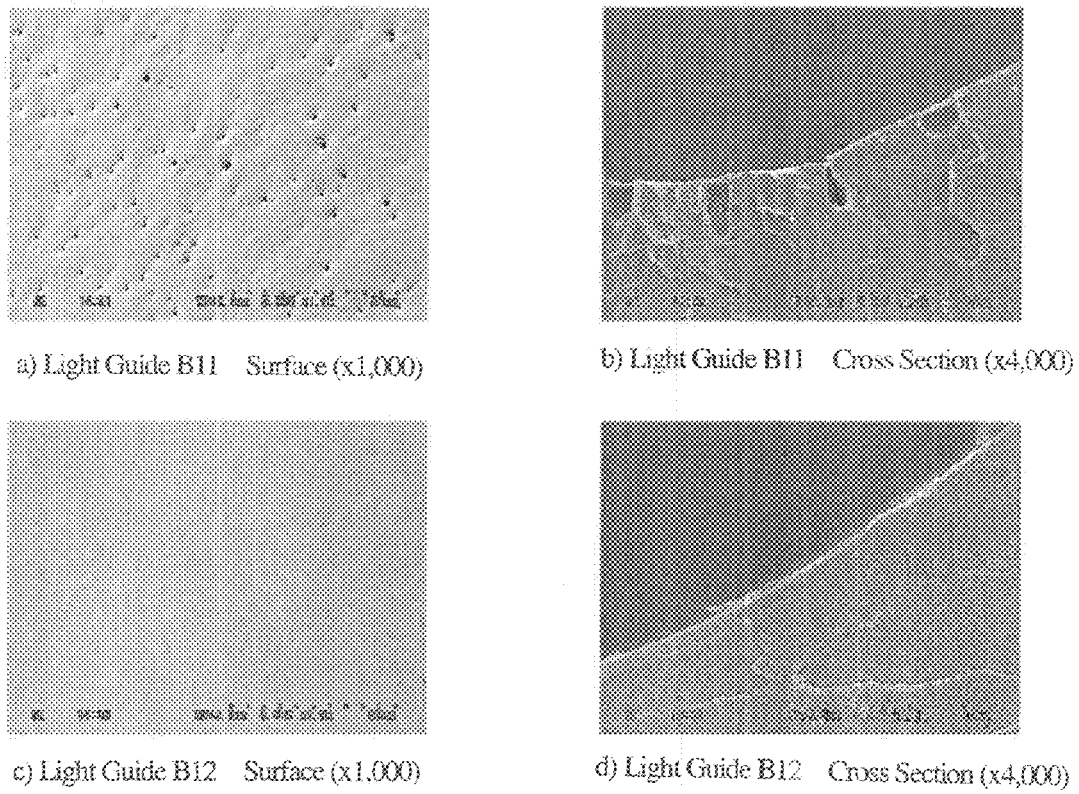
{FIG. 19} A view showing a SEM observation result of the concave portion corresponding to the light emitting mechanism of each of the light guides for surface light source device produced in Example 6 and Comparative Example 6.

FIG. 19 shows a SEM observation result of the light incident edge surface side slope of the light emitting mechanism part. In FIG. 19, observation results of slope surfaces (a, c) and slope cross sections (b, d) of the light guide samples B11 and B12 produced in Example 6 and Comparative Example 6 are shown as representative examples. As can be seen from a and b, in the light emitting mechanism part formed, by the laser etching, on the main surface of the light guide material formed of the acryl cast sheet, several micrometers of unevenness is observed on the surface thereof, and a plurality of several micrometers of bubbles were contained in a localized manner in the vicinity of the slope of the cross section thereof. That is, the foamed surface layer 244 has a cracked, sinkhole shaped, or cavity-containing fine structure, and bubbles are contained in the fine structure. On the other hand, as can be seen from c and d, in the light emitting mechanism part formed, by the laser etching, on the main surface of the extruded acrylic sheet, the surface of the slope is smooth, and no bubble is observed in the cross-section thereof.

Although the observation result has been described based on a comparison between the light guide samples B11 and B12, the same tendency has been observed in comparisons between the light guide samples B9 and B10 and between the light guide samples B13 and B14.

Optical Evaluation Result of Examples 5 to 7 and Comparative Examples 5 to 7

FIG. 20 is a graph illustrating a distribution of luminance at each emission angle obtained by using the light guide (light guide samples B9 and B10 produced in Example 5 and Comparative Example 5) alone. Here, for comparison of profiles of the luminance distribution, data standardized with a value of a peak luminance set to 1.0 is illustrated. In FIG. 20, a horizontal axis represents an angle of emitted light (emission angle), and a vertical axis represents a relative luminance level at each emission angle. The emission angle is defined such that the light incident edge surface side (as viewed from the light emitting mechanism) is set as − (minus) side, and its opposite side is defined as + (plus) side. As illustrated in FIG. 20, in both the light guide samples B9 and B10, by controlling the inclination angle α of the slope of each of the concave portion 101 having the V-groove shaped vertical cross section and foamed surface layer 244 constituting the light emitting mechanism to about 25°, an emission profile having an emission peak at about 40° can be obtained. However, the light guide sample B10 is abruptly increased in emission intensity in the vicinity of the emission peak angle and thus exhibits a profile having high directivity; on the other hand, the light guide sample B9 of the exemplary embodiment of the present invention exhibits a broad emission profile, and broad emission is observed especially on the light incident edge surface side. This is because, in the light guide sample B9, the fine bubbles are contained in a localized manner in the vicinity of the light incident edge surface side slope of the foamed surface layer 244, so that light propagating inside the light guide is emitted while being scattered in an efficient manner.

FIG. 21 illustrates a distribution of luminance at each emission angle obtained when two prism sheets are disposed on the light emitting surface side of each of the light guide samples B9 and B10 produced in Example 5 and Comparative Example 5. As illustrated in FIG. 21, in both the light guide samples, the use of the two prism sheets allows the peak of the luminance distribution to be formed in the normal direction. However, when comparing the emission profiles of both the light guide samples, the light guide sample B9 has a broader emission profile than that of the light guide sample B10.

Table 3 given below shows an angle width (80% peak angle width) assuming a value equal to or more than 80% (relative luminance=0.8) of the peak value in each emission profile of FIG. 21. As shown in Table 3, the 80% peak angle width of the surface light source device produced using the light guide sample B10 is 22.8°; on the other hand, the 80% peak angle width of the surface light source device produced using the light guide sample B9 is 30.5°. Thus, by using the light guide of the embodiment of the present invention, it is possible to obtain an emission profile having a peak in the vicinity of the normal direction to the light emitting surface without using the diffusing sheet to thereby achieve a surface light source device having a wider viewing angle.

TABLE 3

|  | Example 5 | Comparative Example 5 |
| --- | --- | --- |
| Light guide for surface light source device | B9 | B10 |
| 80% peak angle with (degree) | 30.5 | 22.8 |

FIG. 22 illustrates a distribution of luminance at each emission angle obtained by using the light guide (light guide samples B11 and B12 produced in Example 6 and Comparative Example 6) alone. The luminance value is standardized with a value of a peak luminance set to 1.0 as described above. As illustrated in FIG. 22, in both the light guide samples B11 and B12, by controlling the inclination angle α of the slope of each of the concave portion 101 having the V-groove shaped cross section and foamed surface layer 244 constituting the light emitting mechanism to about 45°, an emission profile having an emission peak at about 30° can be obtained. However, the light guide sample B12 is abruptly increased in emission intensity in the vicinity of the emission peak angle and thus exhibits a profile having high directivity; on the other hand, the light guide sample B11 of the exemplary embodiment of the present invention exhibits a broad emission profile, and broad emission is observed especially on the light incident edge surface side. This is because, in the light guide sample B11, the fine bubbles are contained in a localized manner in the vicinity of the light incident edge surface side slope of the foamed surface layer 244, so that light propagating inside the light guide is emitted while being scattered in an efficient manner.

FIG. 23 illustrates a distribution of luminance at each emission angle obtained when one prism sheet 230 having the prism arrays parallel to the light incident edge surface of the light guide is disposed on the light emitting surface side of each of the light guide samples B11 and B12 produced in Example 6 and Comparative Example 6. As illustrated in FIG. 23, in both the light guide samples, the use of the one prism sheet 230 allows the peak of the luminance distribution to be formed in the normal direction. However, when comparing the emission profiles of both the light guide samples, the light guide sample B11 has a broader emission profile than that of the light guide sample B12.

Table 4 given below shows the 80% peak angle width in each emission profile of FIG. 23. As shown in Table 4, the 80% peak angle width of the surface light source device produced using the light guide sample B12 is 38.5°; on the other hand, the 80% peak angle width of the surface light source device produced using the light guide sample B11 is 46.0°. Thus, by using the light guide of the embodiment of the present invention, it is possible to obtain an emission profile having a peak in the vicinity of the normal direction to the light emitting surface without using the diffusing sheet and prism sheet having the prism arrays perpendicular to the light incident edge surface to thereby achieve a surface light source device having a wider viewing angle.

TABLE 4

|  | Example 6 | Comparative Example 6 |
| --- | --- | --- |
| Light guide for surface light source device | B11 | B12 |
| 80% peak angle with (degree) | 46.0 | 38.5 |

FIG. 24 illustrates a distribution of luminance at each emission angle obtained by using the light guide (light guide samples B13 and B14 produced in Example 7 and Comparative Example 7) alone. The luminance value is standardized with a value of a peak luminance set to 1.0 as described above. As illustrated in FIG. 24, in both the light guide samples B13 and B14, by controlling the inclination angle α of the slope of each of the concave portion 101 having the V-groove shaped cross section and foamed surface layer 244 constituting the light emitting mechanism to about 63°, an emission profile having an emission peak at about −10° can be obtained. However, the light guide sample B13 of the exemplary embodiment of the present invention exhibits a broader emission profile than that of the light guide sample B14, and broad emission is observed especially on a side opposite to the light incident edge surface. This is because, in the light guide sample B13, the fine bubbles are contained in a localized manner in the vicinity of the light incident edge surface side slope of the foamed surface layer 244, so that light propagating inside the light guide is emitted while being scattered in an efficient manner.

Thus, it is possible to obtain an emission profile having a peak in the vicinity of the normal direction to the light emitting surface without using the diffusing sheet and prism sheet but only with the light guide alone to thereby achieve a surface light source device having a wider viewing angle.

From the results obtained from Examples 1 to 7 and Comparative Examples 1 to 7, by using the light guide for surface light source device of the present invention, it is possible to achieve a surface light source device having a wide viewing angle and high emission quality and capable of controlling an emission peak to a desired direction.

DESCRIPTION OF REFERENCE NUMERALS 1, 1' Endless belt
2, 2' Pulley
3, 3' Pulley
4 Roll
5 Syrup feed pipe
6 Gasket
7, 8 Steam pipe 9, 10 Drain pipe
11, 12, 13 Blower
14, 14' Heat exchanger
15, 16, 17, 18 Heating zone
19 Plate polymer (Light guide material)
22 LED
24 Light guide
241 Light incident edge surface
242 Light emitting surface
243 Rear surface
244 Foamed surface layer
26 Light diffusing element
28 First light deflecting element
30 Second light deflecting element
32 Light reflecting element
A1, A9 Light guide material
101 Light emission mechanism
110 Light emitting surface
120 Light incident edge surface
130 Rear surface
B1, B9 Light guide for surface light source device
220 Diffusion sheet
230, 240 Prism sheet
301 Foamed surface layer (Light emitting mechanism)
302 Light incident edge surface
303 Rear surface
304 Light emitting surface
310 Reflecting sheet
340 LED
350 Constant-current power supply
360 Luminance meter
401 Supply die
402 Ultraviolet-polymerizable viscous liquid (syrup)
402' Acrylic cast sheet (light guide material)
404 Ultraviolet irradiation device
408 Upper surface pressing roll
408' Lower surface pressing roll
410 Hot-air heating device
413 First film
414 Feeding device
415 Wind-up device
416 Second film
417 Feeding device
418 Wind-up device

The invention claimed is:

1. A plate-like light guide for a surface light source device comprising:
   a light incident edge surface;
   a light emitting surface;
   a rear surface on the opposite side to the light emitting surface; and
   a foamed surface layer formed in at least one of the light emitting surface and the rear surface at at least a part thereof,
   wherein the foamed surface layer contains bubbles, wherein the bubbles are not contained in an area other than the foamed surface layer, and wherein a cross section of the foamed surface layer including a normal direction with respect to the light emitting surface or rear surface has a concave shape.

2. The plate-like light according to claim 1, wherein a thickness of the foamed surface layer is from 1 µm to 50 µm.

3. The plate-like light guide according to claim 1, wherein the each bubble independently has a diameter of from 1 µm to 50 µm.

4. The plate-like light guide according to claim 1, wherein the part at which the foamed surface layer is formed is a dot shape area of one of the light emitting surface and rear surface.

5. The plate-like light guide according to claim 1, wherein the part at which the foamed surface layer is formed is a line shape area of one of the light emitting surface and rear surface.

6. The plate-like light guide according to claim 1, wherein the foamed surface layer and a part of the light guide other than the foamed surface layer are formed of an acrylic resin.

7. A surface light source device comprising:
   the plate-like light guide according to claim 1; and
   a primary light source disposed adjacent to the light incident edge surface of the light plate-like guide.

8. The surface light source device according to claim 7, further comprising a light reflecting element disposed adjacent to the rear surface of the plate-like light guide.

9. The surface light source device according to claim 7, further comprising a light deflecting element disposed adjacent to the light emitting surface of the plate-like light guide.

10. The surface light source device according to claim 9, wherein the light deflecting element has a light incidence surface on a side close to the plate-like light guide and a light emission surface on a side opposite to the plate-like light incidence surface, and the light emission surface includes a plurality of elongated prisms arranged in parallel to each other.

11. A method of producing the plate-like light guide for surface light source device according to claim 1, the method comprising:
    producing a plate-like light guide material formed of an acrylic resin plate by a continuous plate making method; and
    applying laser etching to at least one part of at least one of main surfaces of the plate-like light guide material to form the foamed surface layer.

12. The method of producing the plate-like light guide according to claim 11, wherein a laser used in the laser etching is an infrared laser.

13. The method of producing the plate-like light guide according to claim 11, wherein a thickness of the foamed surface layer is from 1 µm to 50 µm.

14. The method of producing the plate-like light guide according to claim 11, wherein the foamed surface layer contains bubbles and each bubble independently has a diameter of from 1 µto 50 µm.

15. The method of producing the plate-like light guide according to claim 11, wherein the part at which the foamed surface layer is formed is a line shape area or a dot shape area of one of a light emitting surface and a rear surface.

16. The plate-like light guide according to claim 1, wherein the bubbles contain gas having a refractory index different from that of a plate-like light guide material.

17. The plate-like light guide according to claim 1, wherein a thickness of the light guide is form 0.1 to 10 mm.

18. The plate-like light guide according to claim 1, wherein a light diffusion element is further disposed on the light emitting surface.

19. The plate-like light guide according to claim 18, wherein at least one light deflecting element is further disposed on the light diffusion element.

20. The plate-like light guide according to claim 19, wherein a thickness of the at least one light deflecting element, independently, is from 30 to 350 µm.

* * * * *